(12) United States Patent
Feldman et al.

(10) Patent No.: US 12,106,517 B2
(45) Date of Patent: Oct. 1, 2024

(54) METHOD AND APPARATUS FOR MODELING DYNAMIC INTRINSIC PARAMETERS OF A CAMERA

(71) Applicant: THE BOEING COMPANY, Chicago, IL (US)

(72) Inventors: Aaron Feldman, Los Angeles, CA (US); Deepak Khosla, Malibu, CA (US); Yang Chen, Malibu, CA (US); David Huber, Malibu, CA (US)

(73) Assignee: THE BOEING COMPANY, Chicago, IL (US)

( * ) Notice: Subject to any disclaimer, the term of this patent is extended or adjusted under 35 U.S.C. 154(b) by 371 days.

(21) Appl. No.: 17/448,308

(22) Filed: Sep. 21, 2021

(65) Prior Publication Data

US 2023/0086050 A1 Mar. 23, 2023

(51) Int. Cl.
*G06T 7/80* (2017.01)
*G06T 7/73* (2017.01)
(Continued)

(52) U.S. Cl.
CPC .................. *G06T 7/80* (2017.01); *G06T 7/73* (2017.01); *H04N 17/002* (2013.01);
(Continued)

(58) Field of Classification Search
None
See application file for complete search history.

(56) References Cited

U.S. PATENT DOCUMENTS

| 8,396,282 B1 | 3/2013 | Huber et al. |
| 8,995,712 B2 | 3/2015 | Huang et al. |

(Continued)

FOREIGN PATENT DOCUMENTS

| CN | 111340857 A | 6/2020 |
| EP | 3 706 080 A1 | 9/2020 |

(Continued)

OTHER PUBLICATIONS

Z. Zhang, "A flexible new technique for camera calibration," in IEEE Transactions on Pattern Analysis and Machine Intelligence, vol. 22, No. 11, pp. 1330-1334, Nov. 2000, doi: 10.1109/34.888718. (Year: 2000).*

(Continued)

*Primary Examiner* — Siamak Harandi
*Assistant Examiner* — Caroline Tabancay Duffy
(74) *Attorney, Agent, or Firm* — Alston & Bird LLP

(57) ABSTRACT

Apparatuses, systems, and methods dynamically model intrinsic parameters of a camera. Methods include: collecting, using a camera having a focus motor, calibration data at a series of discrete focus motor positions; generating, from the calibration data, a set of constant point intrinsic parameters; determining, from the set of constant point intrinsic parameters, a subset of intrinsic parameters to model dynamically; performing, for each intrinsic parameter of the subset of intrinsic parameters, a fit of the point intrinsic parameter values against focus motor positions; generating a model of the intrinsic parameters for the camera based, at least in part, on the fit of the point intrinsic parameter values against the focus motor positions; and determining a position of a fiducial marker within a field of view of the camera based, at least in part, on the model of the intrinsic parameters for the camera.

21 Claims, 27 Drawing Sheets

(51) Int. Cl.
 H04N 17/00 (2006.01)
 H04N 23/67 (2023.01)
(52) U.S. Cl.
 CPC . *H04N 23/676* (2023.01); *G06T 2207/10148* (2013.01); *G06T 2207/30204* (2013.01)

(56) References Cited

U.S. PATENT DOCUMENTS

| | | | |
|---|---|---|---|
| 10,373,336 B1* | 8/2019 | Islam | B25J 9/1697 |
| 10,839,557 B1* | 11/2020 | Arora | G06T 19/006 |
| 11,688,100 B1 | 6/2023 | Sun et al. | |
| 2014/0132729 A1 | 5/2014 | Foulk et al. | |
| 2017/0094251 A1 | 3/2017 | Wolke et al. | |
| 2017/0287166 A1* | 10/2017 | Claveau | G06T 7/80 |
| 2018/0322657 A1* | 11/2018 | Dubout | G06V 10/44 |
| 2019/0332096 A1 | 10/2019 | Porter et al. | |
| 2019/0364206 A1 | 11/2019 | Dal Mutto et al. | |
| 2020/0273138 A1 | 8/2020 | Chavez et al. | |
| 2020/0318946 A1 | 10/2020 | Wolke | |
| 2022/0230348 A1 | 7/2022 | Huber et al. | |
| 2023/0090757 A1 | 3/2023 | Chen et al. | |

FOREIGN PATENT DOCUMENTS

| | | | | |
|---|---|---|---|---|
| SG | 191452 A1 | 7/2013 | | |
| WO | WO-2019045721 A1 * | 3/2019 | | G06T 7/80 |

OTHER PUBLICATIONS

M. Sarkis, C. T. Senft and K. Diepold, "Calibrating an Automatic Zoom Camera With Moving Least Squares," in IEEE Transactions on Automation Science and Engineering, vol. 6, No. 3, pp. 492-503, Jul. 2009, doi: 10.1109/TASE.2009.2021350. (Year: 2009).*
OpenCV Open Source Computer Vision, "Detection of ChArUco Boards," May 16, 2021, https://docs.opencv.org/3.4/df/d4a/tutorial_charuco_detection.html (Year: 2021).*
Sarkis, M., Senft, C. T., & Diepold, K. (2009). Calibrating an Automatic Zoom Camera With Moving Least Squares. IEEE Transactions on Automation Science and Engineering, 6(3), 492-503. https://doi.org/10.1109/TASE.2009.2021350 (Year: 2009).*
Willson, R. G. (1994). Modeling and calibration of automated zoom lenses. Proceedings of SPIE, 2350(1), 170-186. https://doi.org/10.1117/12.189130 (Year: 1994).*
Zheng, S., Wang, Z., & Huang, R. (2015). Zoom lens calibration with zoom- and focus-related intrinsic parameters applied to bundle adjustment. ISPRS Journal of Photogrammetry and Remote Sensing, 102, 62-72. https://doi.org/10.1016/j.isprsjprs.2015.01.005 (Year: 2015).*
Michel Sarkis et al., "Calibrating an Automatic Zoom Camera With Moving Least Squares," IEEE Transactions on Automation Science and Engineering, 6(3):492-503, (Jul. 2009).
Reg G. Willson, "Modeling and Calibration of Automated Zoom Lenses," Technical Report CMU-RI-TR-94-03, The Robotics Institute, Carnegie Mellon University, 189 pages, (Jan. 1994).
Shunyi Zheng et al., "Zoom lens calibration with zoom- and focus-related intrinsic parameters applied to bundle adjustment," ISPRS Journal of Photogrammetry and Remote Sensing, 102:62-72, (2015).
Extended European Search Report received for European Application No. 22178289.9, mailed Dec. 9, 2022, 11 pages.
Extended European Search Report received for European Application No. 22180106.1, mailed on Jan. 4, 2023, 11 pages.
Alvarez, L. et al., "Accurate depty dependent lens distortion models: an application to planar view scenarios," J. Math Imaging Vis., 39:75-85, (Jan. 2011).
Byeon, M. et al., "Variational interference for 3-D localization and tracking of multiple targets using multiple cameras," IEEE Transactions on Neural Networks and Learning Systems, 30(11):3260-3274, (2019).
Byun et al., "Accurate control of a pan-tilt system based on parameterization of rotational motion," arXiv preprint arXiv:1812.00232, 2018.
Camera Calibration and 3D Reconstruction, https://docs.opencv.org/2.4/modules/calib3d/doc/camera_calibration_and_3d_reconstruction.htm.
Davis et al., "Calibrating pan-tilt cameras in wide-area surveillance networks," In Proceedings of the Ninth IEEE International Conference on Computer Vision, IEEE Computer Society, vol. 2, p. 144, 2003.
Ercan, A. et al., "Object tracking in the presence of occulusions using multiple cameras: A sensor network approach," ACM Transactions on Sensor Networks (TOSN), 9(2):1-36, (2013).
Lu, Z. et al., "Camera calibration method with focus-related intrinsic parameters based on the thin-lens model," Optics Express, 28(14):20858-20878, (Jul. 2020).
Wu, B. et al., "A flexible method for zoom lens calibration and modeling using a planar checkboard," Photogrammetric engineering and remote sensing, 79(6):555-571, (Jun. 2013).
Wu, Z. et al., "Keeping a pan-tilt-zoom camera calibrated," IEEE Transactions on Pattern Analysis and Machine Intelligence, 35(8):994-2007, (2012).
You, Q. et al., "Real-time 3D Deep Multi-Camera Tracking," arXiv preprint arXiv:2003.11753.
Zhang, Z., "A flexible newtechnique for camera calibration," IEEE Transactions on Pattern Analysis and Machine Intelligence, 22(11):1330-1334, (2000).

* cited by examiner $$s \begin{pmatrix} u \\ v \\ 1 \end{pmatrix} = K[R\ T] \begin{pmatrix} x_w \\ y_w \\ z_w \\ 1 \end{pmatrix}$$

$$K = \begin{pmatrix} f & 0 & u_0 \\ 0 & f & v_0 \\ 0 & 0 & 1 \end{pmatrix}$$

Figure 6

$$\begin{pmatrix} x_c \\ y_c \\ z_c \end{pmatrix} = [R\ T] \begin{pmatrix} x_w \\ y_w \\ z_w \\ 1 \end{pmatrix}$$

$$\begin{pmatrix} x' \\ y' \end{pmatrix} = \begin{pmatrix} x_c/z_c \\ y_c/z_c \end{pmatrix}$$

$$r^2 = x'^2 + y'^2 \quad a = (1 + k_1 r^2 + k_2 r^4 + k_3 r^6)$$

$$\begin{pmatrix} x'' \\ y'' \end{pmatrix} = \begin{pmatrix} ax' + 2p_1 x' y' + p_2(r^2 + 2x'^2) \\ ay' + 2p_2 x' y' + p_1(r^2 + 2y'^2) \end{pmatrix}$$

$$\begin{pmatrix} u \\ v \\ 1 \end{pmatrix} = K \begin{pmatrix} x'' \\ y'' \\ 1 \end{pmatrix}$$

Figure 7

| Position | Focus Motor Position | u0 | v0 | f | k1 | k2 | Mean Re-projection Error | RMS Re-projection Error |
|---|---|---|---|---|---|---|---|---|
| 1 | 292 | 4022.459 | 3160.366 | 45369.823 | 1.657 | 29.362 | 1.626 | 3.976 |
| 2 | 323 | 4000.222 | 3101.568 | 45140.556 | 1.630 | 30.222 | 1.490 | 3.657 |
| 3 | 372 | 3968.314 | 3175.700 | 44827.806 | 1.636 | 25.855 | 1.127 | 2.788 |
| 4 | 420 | 3953.996 | 3123.996 | 44600.384 | 1.606 | 25.563 | 0.700 | 1.721 |
| 5 | 428 | 3976.378 | 3128.209 | 44562.408 | 1.573 | 29.054 | 0.586 | 1.324 |
| 6 | 435 | 3958.618 | 3109.231 | 44467.084 | 1.582 | 27.009 | 0.487 | 1.237 |
| 7 | 473 | 4002.210 | 3144.668 | 44320.494 | 1.566 | 27.170 | 0.489 | 0.795 |
| 8 | 521 | 3960.435 | 3111.745 | 44045.697 | 1.551 | 25.232 | 0.410 | 0.605 |
| 9 | 526 | 3979.396 | 3122.653 | 44016.144 | 1.548 | 24.675 | 0.467 | 0.728 |
| 10 | 563 | 3948.866 | 3054.240 | 43848.118 | 1.557 | 21.935 | 0.458 | 0.668 |
| 11 | 572 | 3953.160 | 3073.619 | 43715.774 | 1.528 | 23.592 | 0.460 | 0.687 |
| 12 | 606 | 3945.179 | 3084.482 | 43695.638 | 1.547 | 20.927 | 0.495 | 0.740 |

Figure 10

| | Nominal value | Perturb value | Perturb (%) | Δx (mm) | Δy (mm) | Δz (mm) | Re-projection error |
|---|---|---|---|---|---|---|---|
| f (pixel) | 44000 | 600 | 1.5% | .004 | .004 | 150 | 0.4 |
| u0 (pixel) | 4000 | 60 | 1.5% | 7.5 | .03 | 3 | 0.3 |
| v0 (pixel) | 3100 | 140 | 4.5% | .01 | 15 | 2 | 0.25 |
| k1 | 1.5 | 0.15 | 10% | .003 | .001 | 2 | 0.4 |
| k2 | 25 | 4 | 15% | 0.0001 | 0.0001 | .15 | 0.04 |

Figure 14

| Method | ΔRoll | ΔPitch | ΔYaw | ΔX | ΔY | ΔZ | ΔAngle RMSE | ΔPosition RMSE | Re-projection Error | Improvement Angle w.r.t. median intrinsics | Improvement Position w.r.t. median intrinsics | Improvement 6-DOF w.r.t. median intrinsics |
|---|---|---|---|---|---|---|---|---|---|---|---|---|
| | deg | deg | deg | mm | mm | mm | deg | mm | pixel | % | % | % |
| Median Intrinsics | 0.052 | 0.055 | 0.012 | 3.501 | 3.910 | 43.85 | 0.044 | 25.500 | 0.782 | | | |
| Dynamic Intrinsics (LC) | 0.045 | 0.037 | 0.009 | 1.879 | 2.726 | 4.444 | 0.033 | 3.200 | 0.747 | 23.53% | 87.45% | 55.49% |
| Dynamic Intrinsics (LL) | 0.052 | 0.055 | 0.007 | 1.145 | 2.007 | 4.445 | 0.044 | 2.892 | 0.802 | 0.21% | 88.65% | 44.43% |

Figure 16

METHOD AND APPARATUS FOR MODELING DYNAMIC INTRINSIC PARAMETERS OF A CAMERA

TECHNOLOGICAL FIELD

An example embodiment described herein relates generally to modeling dynamic intrinsic parameters of a camera, and more specifically, to determining which intrinsic parameters of a camera affect pose estimation, and modeling those intrinsic parameters to improve the accuracy of pose estimation of a fiducial marker, particularly when using an autofocusing camera.

BACKGROUND

A number of applications are dependent upon the determination of the position of a fiducial marker. However, the position of a fiducial marker alone may not be sufficient. Instead, six-degree of freedom (DOF) pose information, that is, information defining the three-dimensional position and orientation, of the fiducial marker must be determined to locate and interact with the fiducial marker with sufficient precision. In this regard, the three-dimensional position and orientation may be defined in terms of x, y and z coordinates for the three-dimensional position and pitch, roll and yaw for the orientation.

For example, a fiducial marker may need to be identified, such as in terms of six-DOF pose information, in conjunction with various manufacturing operations, such as manufacturing operations to be performed in an automated or robotic manner. For example, automated painting operations, drilling operations, cutting operations, finishing operations and other manufacturing operations frequently require the precise determination of the three-dimensional position and orientation of the various tools utilized by a robot. As such, a fiducial marker may be attached to the robot manipulator which engages the various tools. By precisely identifying the fiducial marker in terms of its three-dimensional position and orientation, the position and orientation of the robot manipulator and, in turn, the tools utilized by the robot may be determined, thereby allowing the manufacturing operations to be performed in precise positions. Further, movement required in relation to the performance of the manufacturing operations may be precisely performed utilizing closed loop control based upon the six DOF pose information for the fiducial marker.

Metrology techniques utilized to determine the six-DOF pose information for a fiducial marker may require relatively expensive equipment, such as one or more laser range finders, projectors, etc. This equipment is generally not only expensive, but may be appropriate for only a limited number of tasks and oftentimes must be manually calibrated, thereby increasing both the time required to identify a fiducial marker and the training or experience required of a technician in order to calibrate the specialized equipment. Additionally, at least some of the equipment, such as the sensors, utilized by metrology techniques to determine the six-DOF pose information of a fiducial marker must remain fixed in position following calibration. In this regard, a plurality of sensors, that is, a sensor wall, may be configured to obtain images of different portions of a space in which the fiducial marker is disposed. This constraint limits the utility of at least some of the equipment, particularly in instances in which a plurality of sensors are utilized in combination, since movement of the equipment following calibration will require that the calibration process be repeated, thereby extending the time required to identify a fiducial marker, such as in terms of the six-DOF pose information.

Additionally, visual metrology, such as used in conjunction with the identification of a fiducial marker for manufacturing operations, generally requires a relatively high level of accuracy. As such, metrology techniques developed for other applications, such as for wide-area surveillance applications, that require less accuracy may be incapable of determining the six-DOF pose information of a fiducial marker with the accuracy demanded by at least some applications, such as those involving manufacturing operations.

BRIEF SUMMARY

An apparatus and method are provided for modeling dynamic intrinsic parameters of a camera, and more specifically, to determining which intrinsic parameters of a camera affect pose estimation, and modeling those intrinsic parameters to improve the accuracy of pose estimation of a fiducial marker, particularly when using an autofocusing camera. Embodiments include a method for modeling intrinsic parameters of a camera, the method including: collecting, using the camera having a focus motor, calibration data at a series of discrete focus motor positions; generating, from the calibration data, a set of constant point intrinsic parameters; determining, from the set of constant point intrinsic parameters, a subset of intrinsic parameters to model dynamically; performing, for each intrinsic parameter of the subset of intrinsic parameters, a fit of point intrinsic parameter values against the focus motor positions; generating a model of intrinsic parameters for the camera based, at least in part, on the fit of the point intrinsic parameter values against the focus motor positions; and determining a position of a fiducial marker within a field of view of the camera based, at least in part, on the model of the intrinsic parameters for the camera.

According to an example embodiment, determining the subset of intrinsic parameters to model dynamically includes determining which intrinsic parameters alter a position estimate of the fiducial marker. Determining which intrinsic parameters alter the position estimate of the fiducial marker, in some embodiments, includes perturbing each constant point intrinsic parameter of the set of constant point intrinsic parameters to determine which intrinsic parameters alter the position estimate of the fiducial marker. Performing the fit of the intrinsic parameter values against the focus motor positions includes, in some embodiments, performing the fit using a least squares polynomial regression of the point intrinsic parameter values against the focus motor positions to generate the model of the intrinsic parameters for the camera.

According to some embodiments, generating a model of the intrinsic parameters for the camera further includes performing joint refinement on the fit of the point intrinsic parameter values against the focus motor positions for the subset of intrinsic parameters. Performing the joint refinement on the fit of the point intrinsic parameter values against the focus motor positions for the subset of intrinsic parameters, in some embodiments, includes performing focus-based bundle adjustment on the fit of the point intrinsic parameter values against the focus motor positions for the subset of intrinsic parameters. According to some embodiments, collecting, using the camera having a focus motor, the calibration data at the set of discrete focus motor positions includes capturing a plurality of images using the camera at different orientations using different focal distances. Capturing the plurality of images at different orientations using different focal distances includes, in some embodiments, capturing the plurality of images of a ChArUco board using the camera at different orientations using different focal distances.

Embodiment provided herein include an apparatus for modeling intrinsic parameters of a camera, the apparatus including: the camera configured to acquire a plurality of static images of different orientations of a space in which a fiducial marker is disposed; a control system configured to: determine calibration data from the plurality of static images; generate, from the calibration data, a set of constant point intrinsic parameters; determine, from the set of constant point intrinsic parameters, a subset of intrinsic parameters to model dynamically; perform, for each intrinsic parameter of the subset of intrinsic parameters, a fit of point of intrinsic parameter values against focus motor positions; generate a model of intrinsic parameters for the camera based, at least in part, on the fit of the point intrinsic parameter values against the focus motor positions; and determine a position of a fiducial marker within a field of view of the camera based, at least in part, on the model of the intrinsic parameters for the camera.

According to some embodiments, the control system configured to determine the subset of intrinsic parameters to model dynamically is further configured to determine which intrinsic parameters alter a position estimate of the fiducial marker. The control system configured to determine which intrinsic parameters alter the position estimate of the fiducial marker of some embodiments is further configured to perturb the constant point intrinsic parameter of the set of constant point intrinsic parameters to determine which intrinsic parameters alter the position estimate of the fiducial marker. The control system configured to perform the fit of the intrinsic parameter values against the focus motor positions of some embodiments is further configured to perform the fit using a least squares polynomial regression of the point intrinsic parameter values against the focus motor positions to generate the model of the intrinsic parameters for the camera.

According to some embodiments, the control system configured to generate a model of the intrinsic parameters for the camera is further configured to perform joint refinement on the fit of the point intrinsic parameter values against the focus motor positions for the subset of intrinsic parameters. The control system configured to perform the joint refinement on the fit of the point intrinsic parameter values against the focus motor positions for the subset of intrinsic parameters is, in some embodiments, further configured to perform focus-based bundle adjustment on the fit of the point intrinsic parameter values against the focus motor positions for the subset of intrinsic parameters. The fiducial marker of some embodiments is a ChArUco board.

Embodiments provided herein include a control system for modeling intrinsic parameters of a camera, the control system configured to: collect, using the camera having a focus motor, calibration data at a series of discrete focus motor positions; generate, from the calibration data, a set of constant point intrinsic parameters; determine, from the set of constant point intrinsic parameters, a subset of intrinsic parameters to model dynamically; perform, for each intrinsic parameter of the subset of intrinsic parameters, a fit of point intrinsic parameter values against the focus motor positions; generate a model of intrinsic parameters for the camera based, at least in part, on the fit of the point intrinsic parameter values against the focus motor positions; and determine a position of a fiducial marker within a field of view of the camera based, at least in part, on the model of the intrinsic parameters for the camera.

According to some embodiments, the control system to determine the subset of intrinsic parameters to model dynamically is further configured to determine which intrinsic parameters alter a position estimate of the fiducial marker. The control system configured to determine which intrinsic parameters alter the position estimate of the fiducial marker is, in some embodiments, further configured to perturb each constant point intrinsic parameter of the set of constant point intrinsic parameters to determine which intrinsic parameters alter the position estimate of the fiducial marker. The control system configured to perform the fit of the intrinsic parameter values against the focus motor positions is, in some embodiments, further configured to perform the fit using a least squares polynomial regression of the point intrinsic parameter values against the focus motor positions to generate the model of the intrinsic parameters for the camera. The control system of some embodiments configured to generate a model of the intrinsic parameters for the camera is further configured to perform joint refinement on the fit of the point intrinsic parameter values against the focus motor positions for the subset of intrinsic parameters.

BRIEF DESCRIPTION OF THE DRAWINGS

Figure 1:
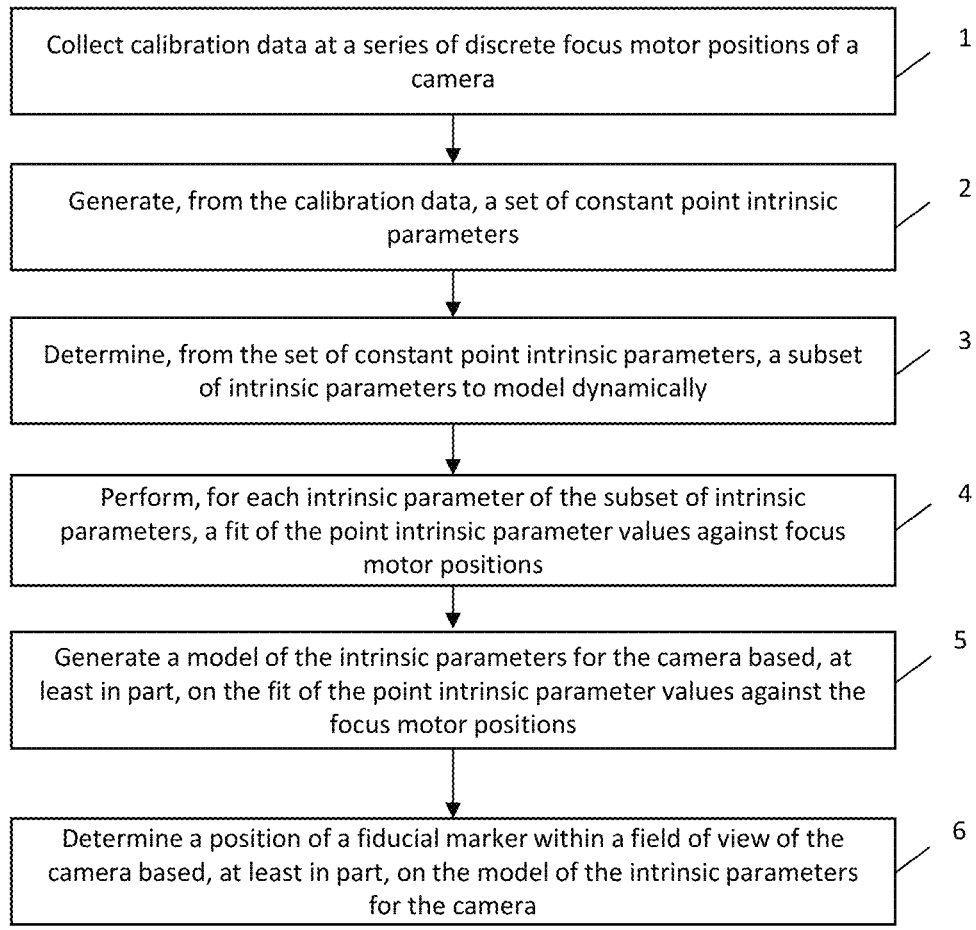
Figure 2:
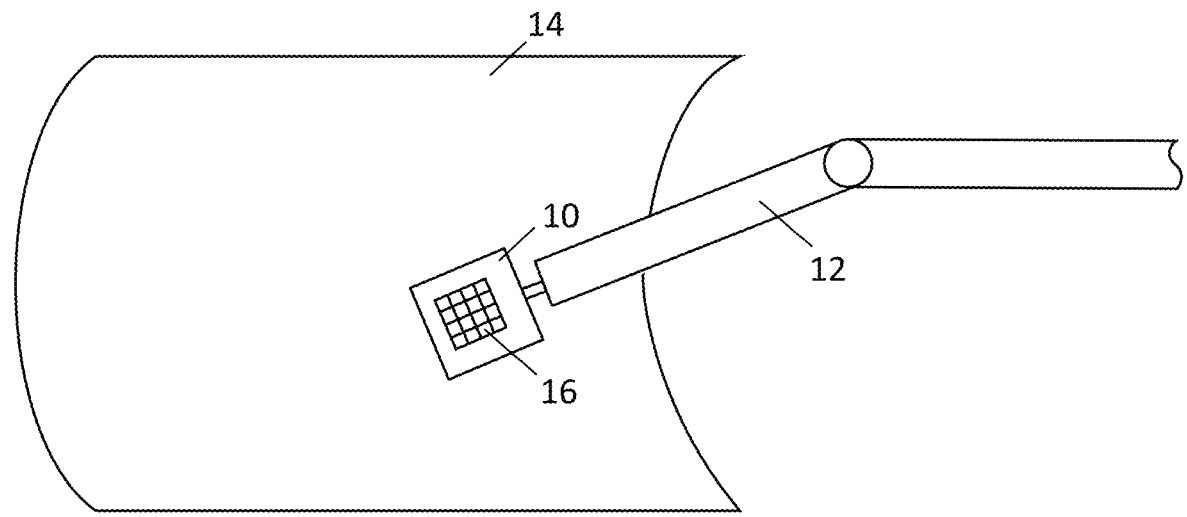
Figure 3:
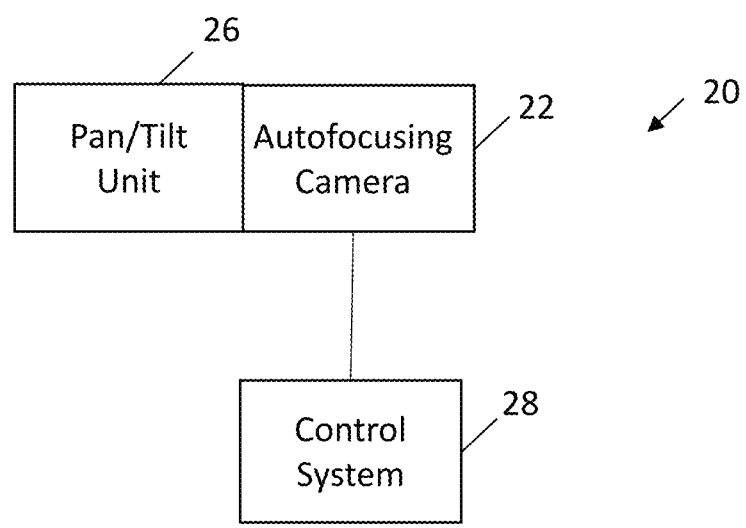
Figure 4:
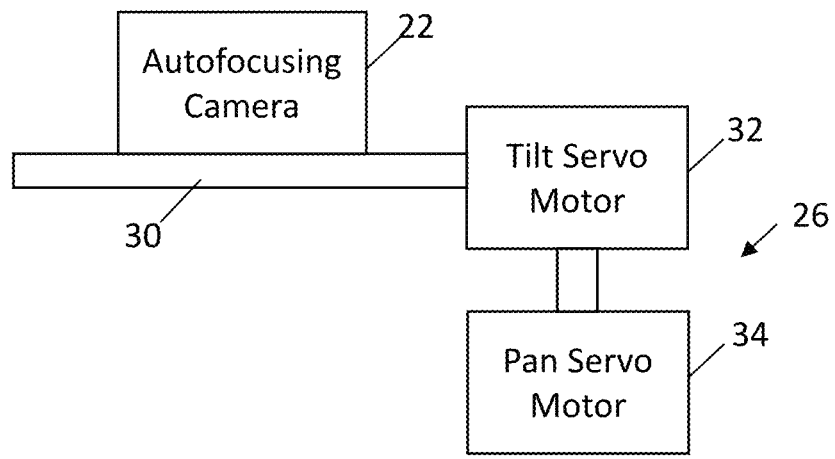
Figure 5:
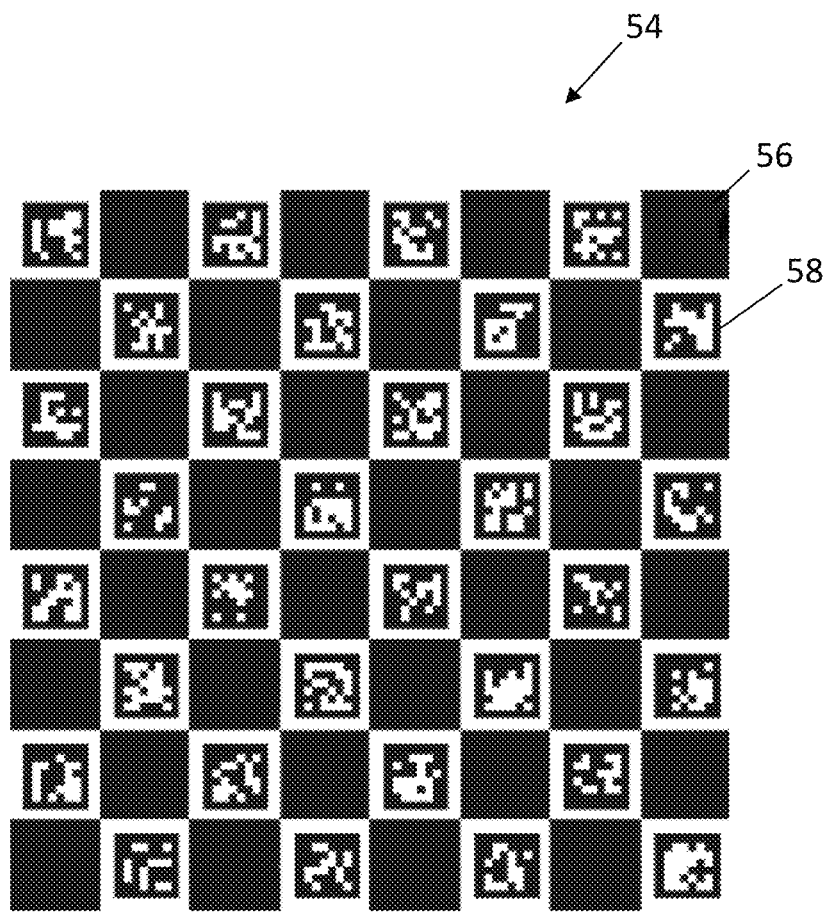
Figure 8:
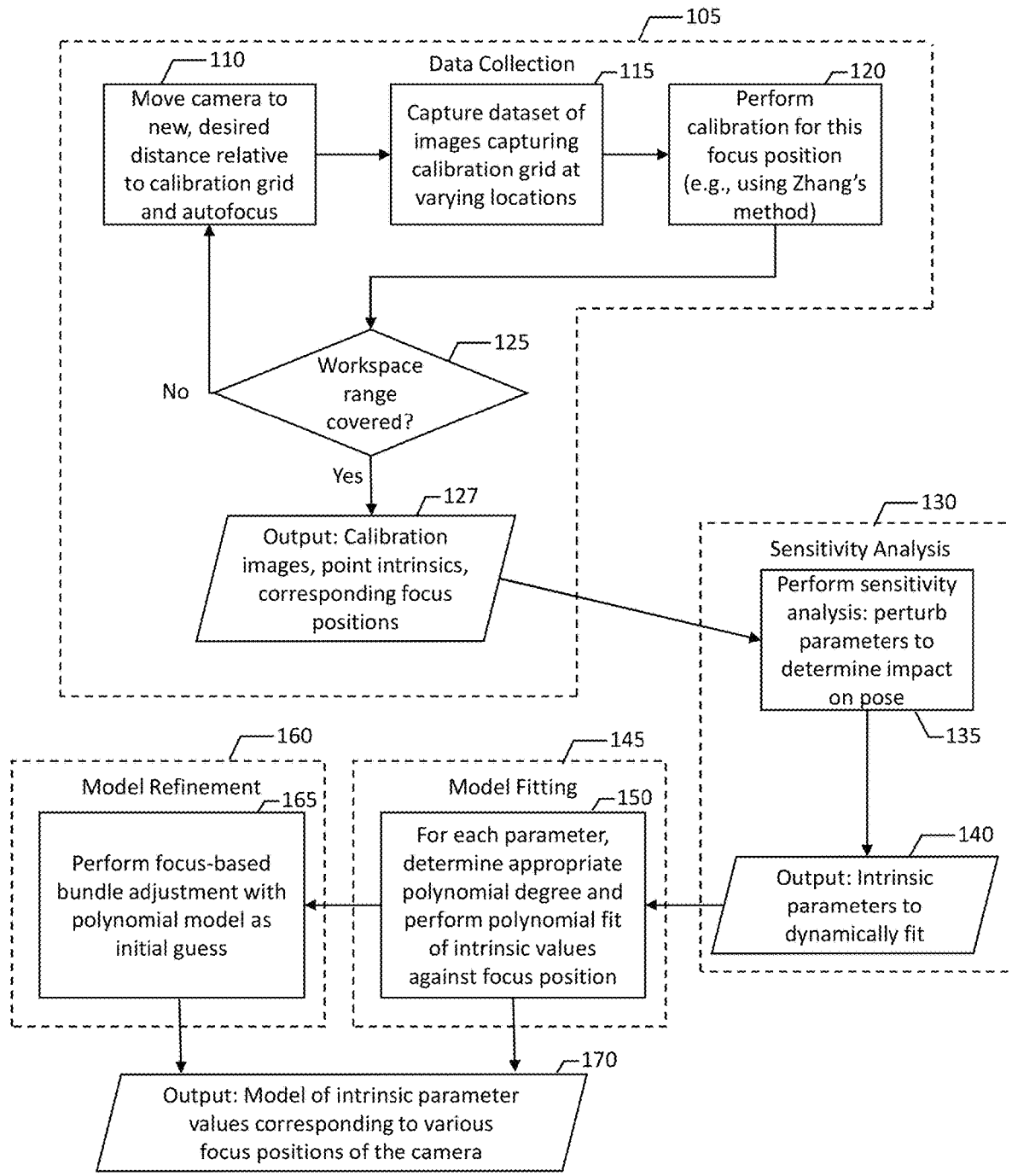
Figure 9:
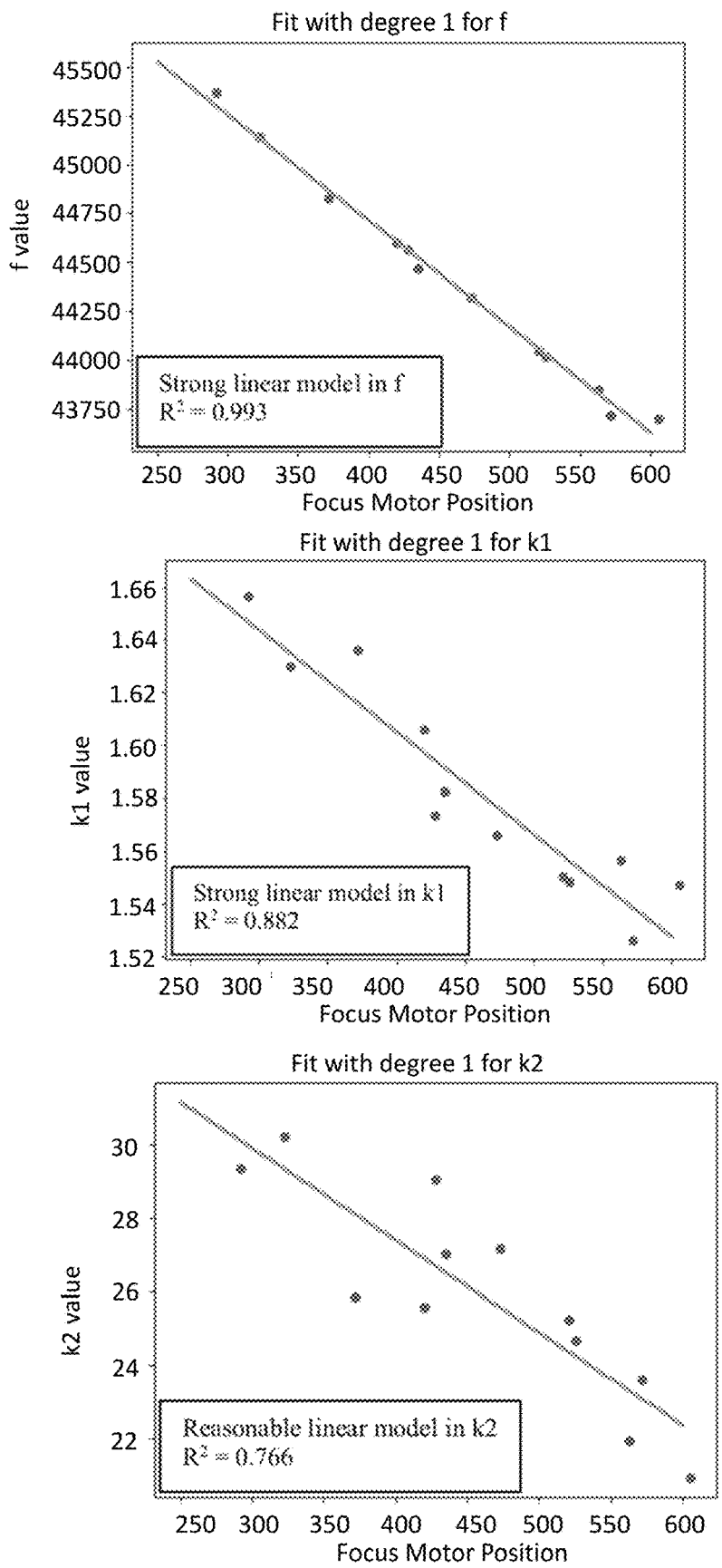
Figure 13A:
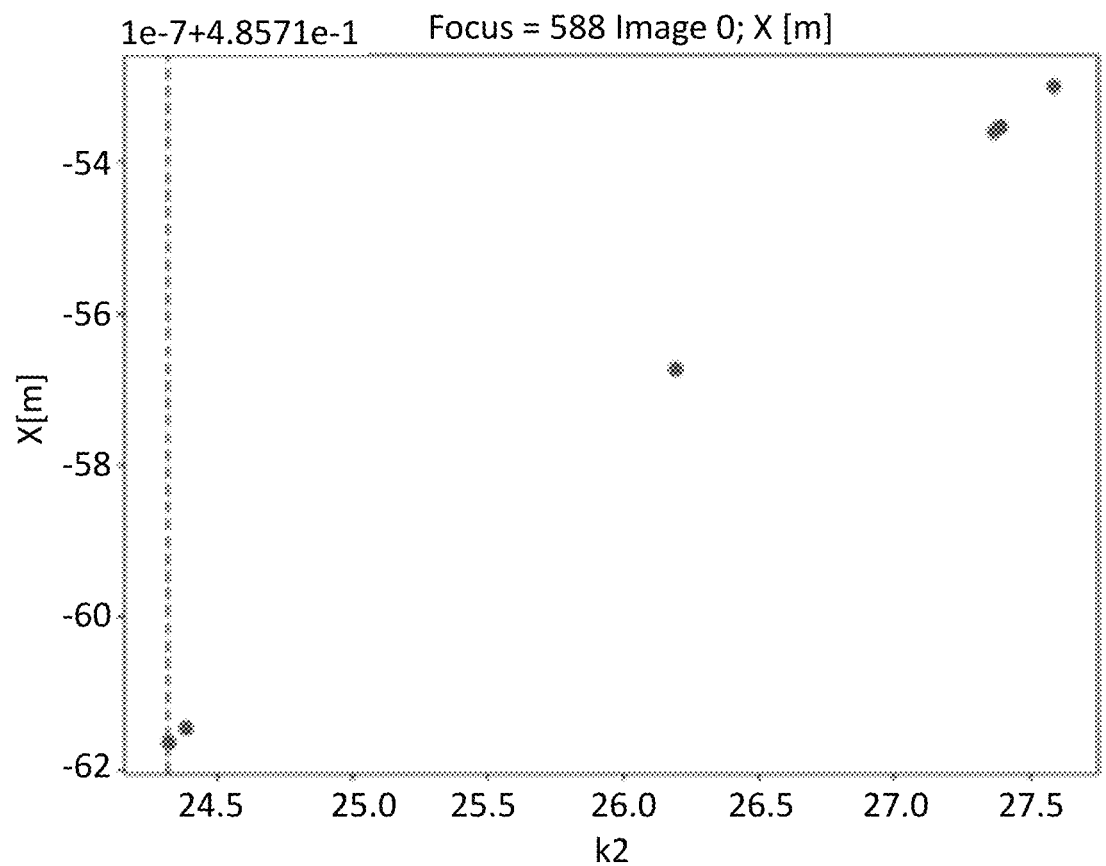
Figure 13B:
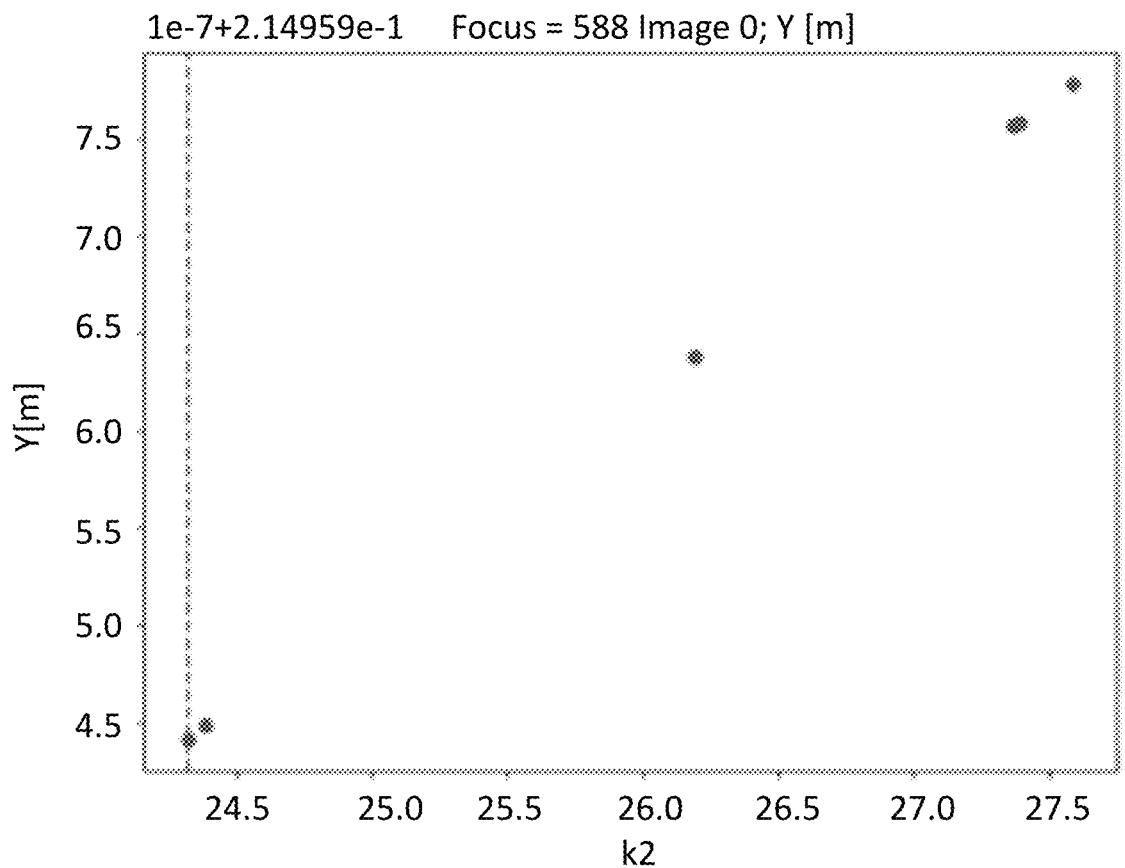
Figure 13C:
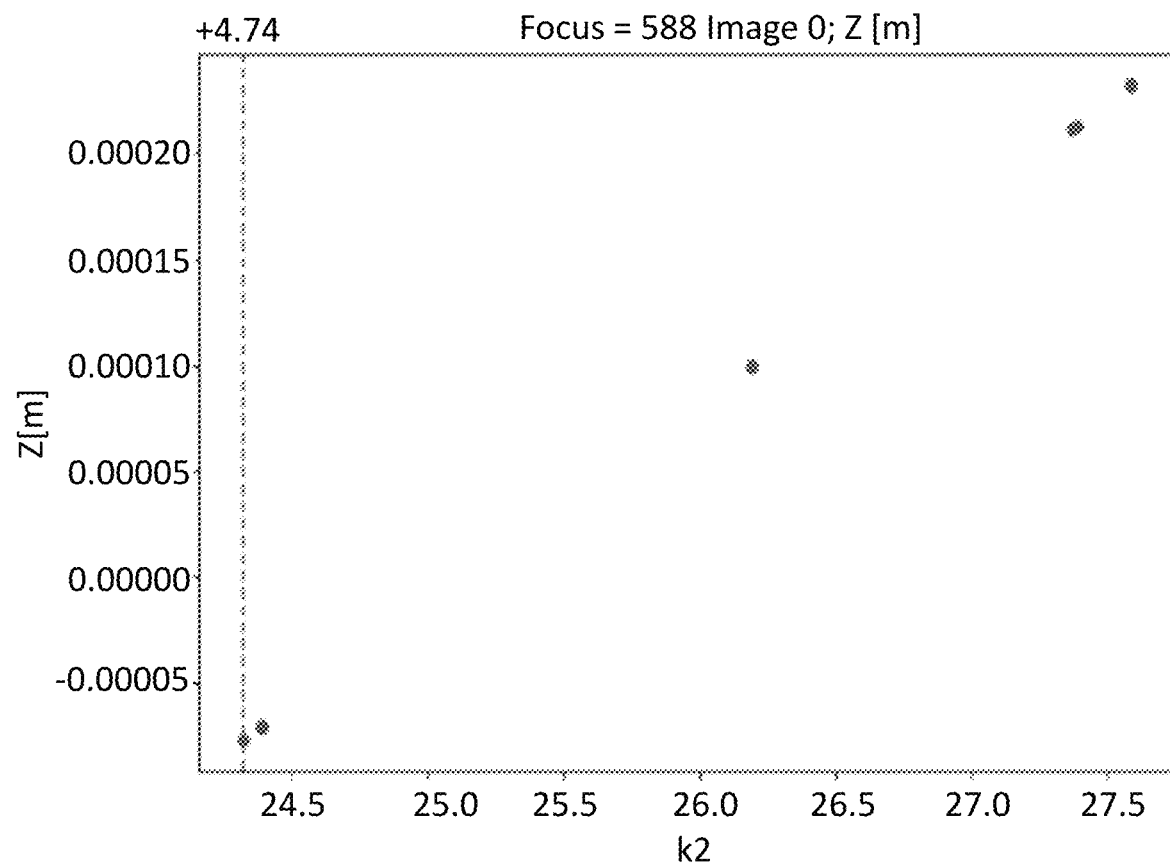
Figure 15:
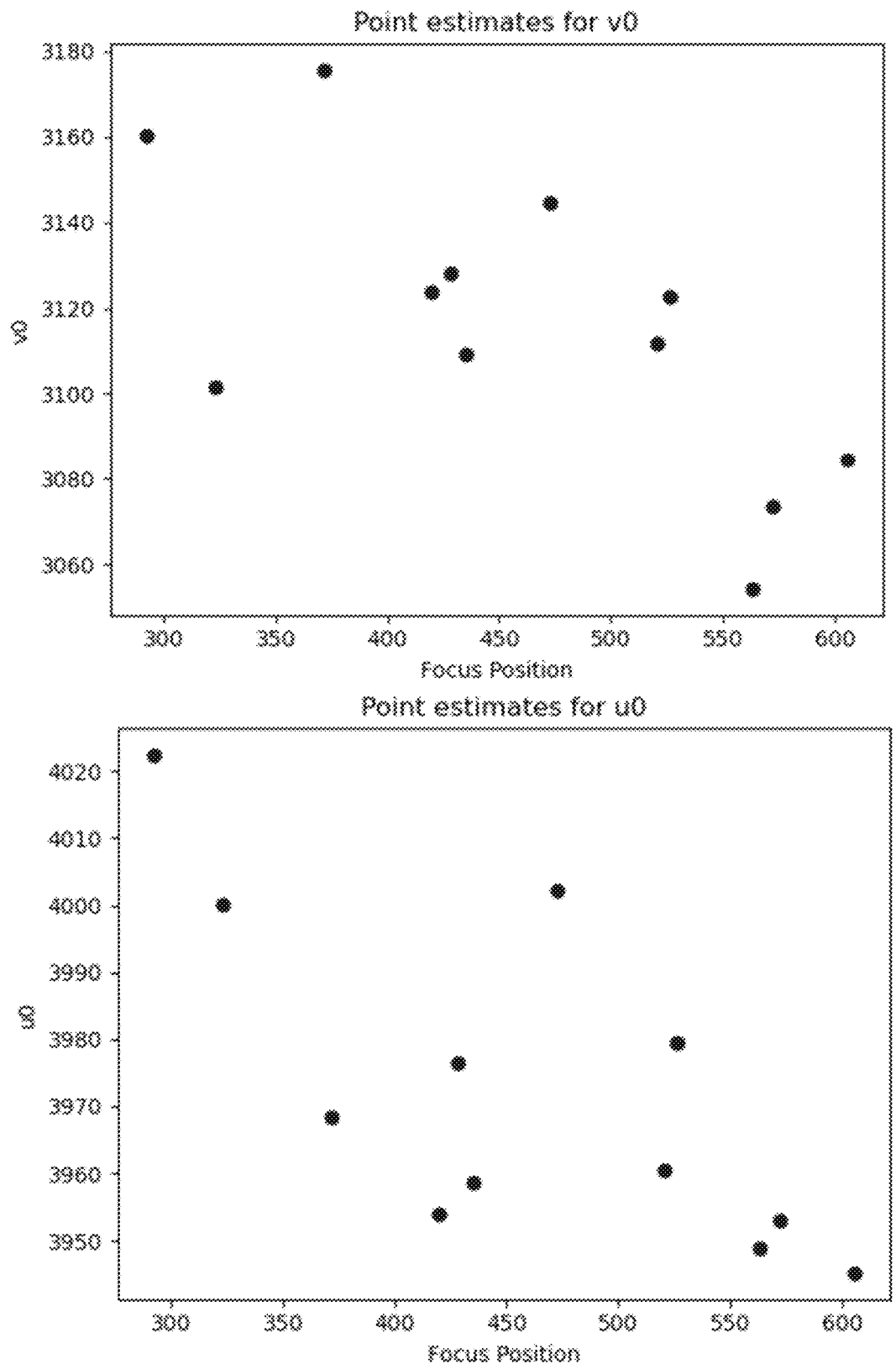
Figure 17:
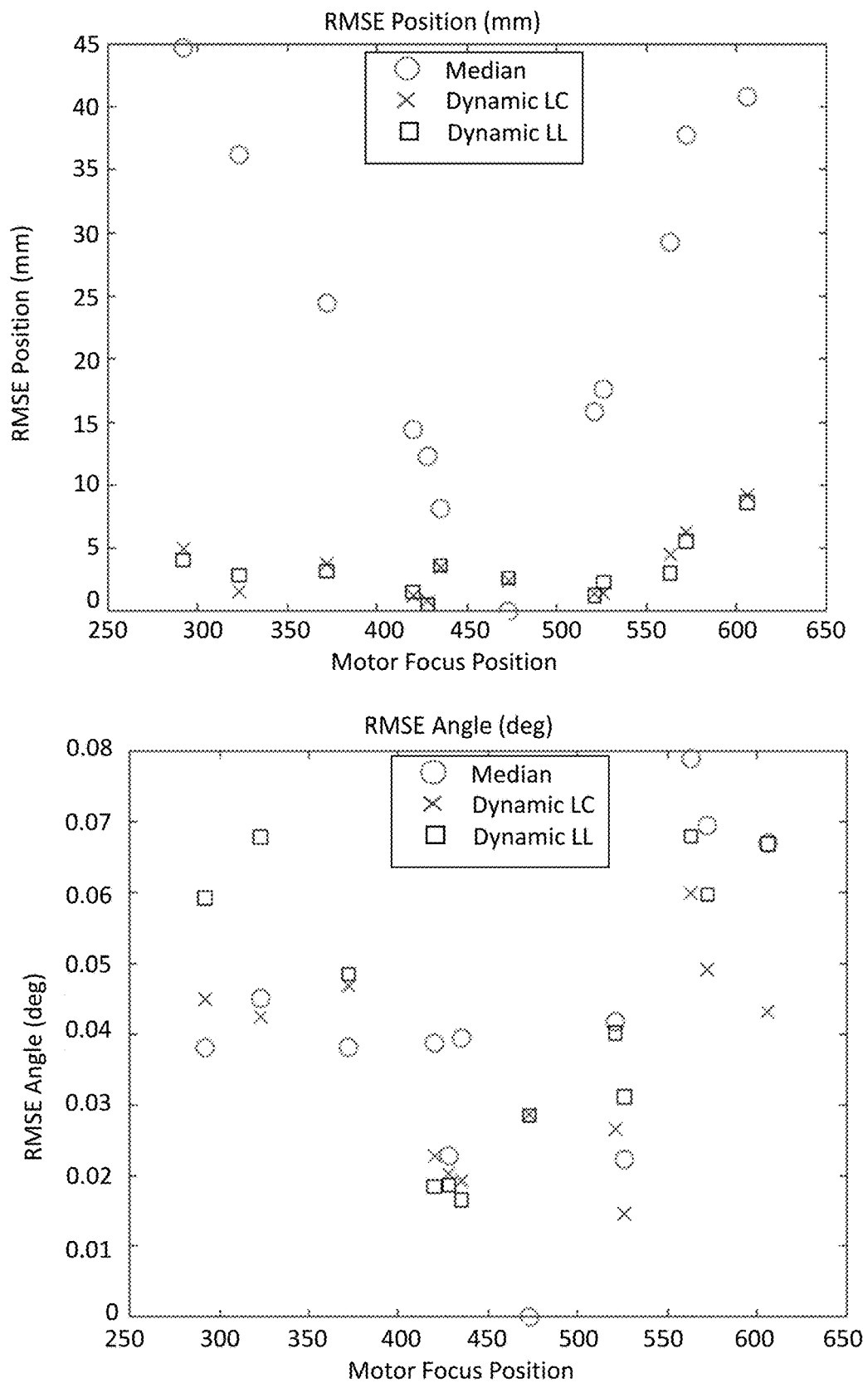
Figure 18:
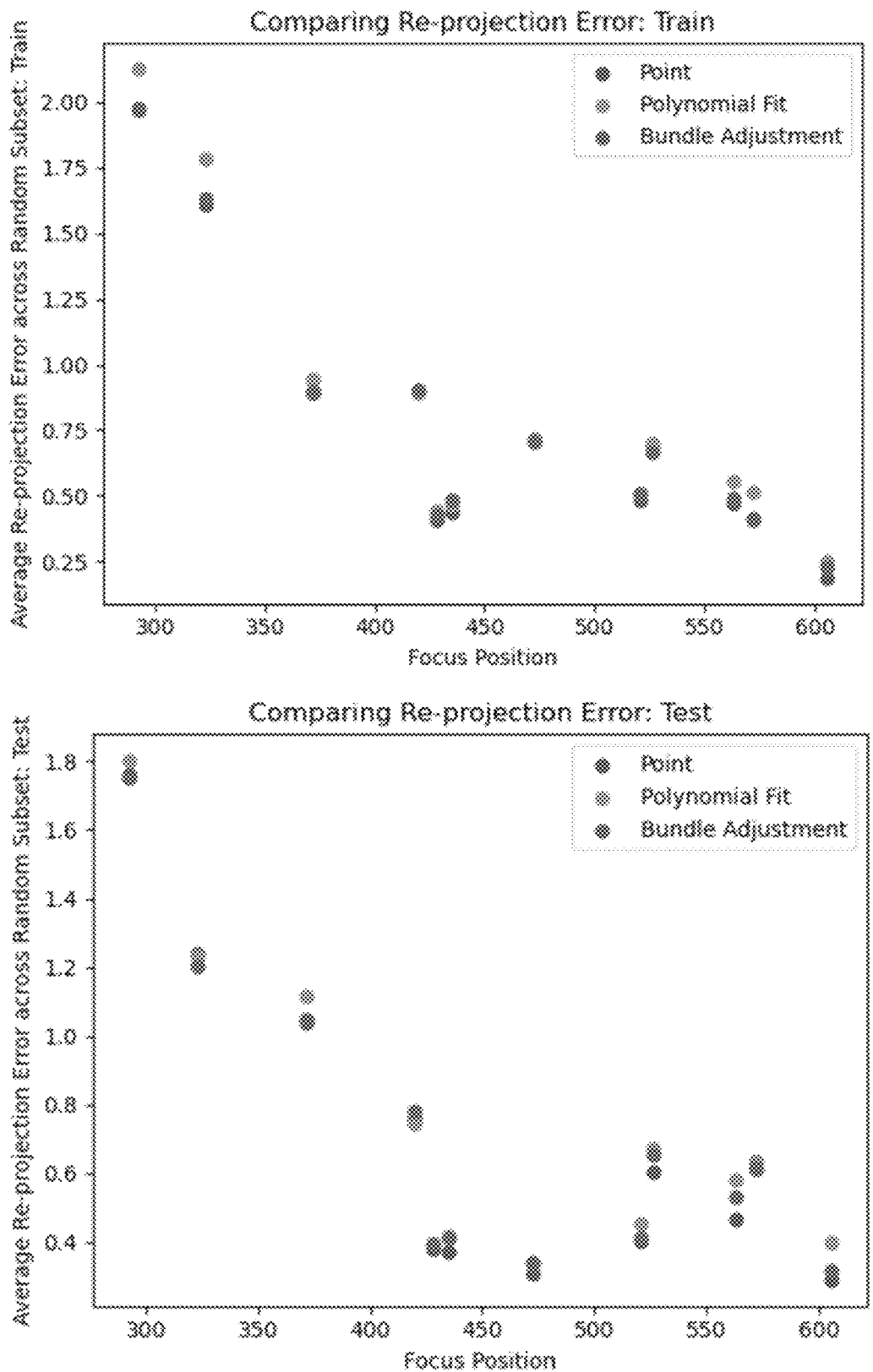

Having thus described certain example embodiments of the present disclosure in general terms, reference will hereinafter be made to the accompanying drawings, which are not necessarily drawn to scale, and wherein:

FIG. 1 illustrates a flowchart of a method for dynamically modeling intrinsic parameters of a camera according to an example embodiment of the present disclosure;

FIG. 2 is a perspective view of a workpiece and an associated paint head for which the six-degree of freedom (DOF) pose information, namely, position and orientation, is determined in accordance with an example embodiment of the present disclosures;

FIG. 3 illustrates an apparatus configured to determine the position and orientation of a fiducial marker in accordance with an example embodiment of the present disclosure;

FIG. 4 depicts a pan-tilt unit and a narrower field-of-view sensor supported by the pan-tilt unit in accordance with an example embodiment of the present disclosure;

FIG. 5 illustrates a ChArUco board according to an example embodiment of the present disclosure;

FIG. 6 illustrates the mathematical specification for mapping from the three-dimensional world frame to a two-dimensional image plane without including lens distortion according to an example embodiment of the present disclosure;

FIG. 7 illustrates the mathematical specification for mapping from the three-dimensional world frame to a two-dimensional image plane including lens distortion according to an example embodiment of the present disclosure;

FIG. 8 is a flowchart of operations performed for dynamically modeling intrinsic parameters of a camera according to an example embodiment of the present disclosure;

FIG. 9 illustrates polynomial fits along with the obtained point intrinsic parameter values against the focus motor position according to an example embodiment of the present disclosure;

FIG. 10 is a table illustrating point intrinsic values captured in data collection from images captured at different positions and orientations according to an example embodiment of the present disclosure;

FIGS. 11A-F illustrate the results of sensitivity analysis on a dataset of six focus motor positions from the example implementation according to an example embodiment of the present disclosure;

FIGS. 12A-F further illustrates the results of sensitivity analysis on a dataset of six focus motor positions from the example implementation according to an example embodiment of the present disclosure;

FIGS. 13A-C still further illustrates the results of sensitivity analysis on a dataset of six focus motor positions from the example implementation according to an example embodiment of the present disclosure;

FIG. 14 is a table summarizing the sensitivity analysis results according to an example embodiment of the present disclosure;

FIG. 15 illustrates point intrinsic results for two intrinsic parameters across twelve different focus motor positions according to an example embodiment of the present disclosure;

FIG. 16 is a table depicting experimental comparison of median intrinsics against two dynamic intrinsic models—Linear Constant and Linear Linear, according to an example embodiment of the present disclosure;

FIG. 17 illustrates a plot of root mean square errors in position and angle with respect to focus motor position for the three models represented in FIG. 16 according to an example embodiment of the present disclosure; and FIG. 18 illustrates plots comparing re-projection error for point intrinsics, initial polynomial fit, and after focus-based bundle adjustment according to an example embodiment of the present disclosure.

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

An apparatus and method are provided for modeling dynamic intrinsic parameters of a camera, and more specifically, to determining which intrinsic parameters of a camera affect pose estimation, and modeling those intrinsic parameters to improve the accuracy of pose estimation of a fiducial marker, particularly when using an autofocusing camera. Embodiments described herein provide an approach for dynamically modeling the intrinsic parameters of a camera, generally an autofocusing camera, to improve visual pose (position and orientation) estimation of a fiducial marker. Embodiments model the intrinsic parameters as a function of the focus motor position, extending standard calibration approaches that presume a fixed focal distance and produce static/constant intrinsic parameters. These point intrinsic parameters are used to gauge each parameter's impact on the pose estimate, helping identify which parameters should be modelled dynamically. The identified parameters can then be independently fit, such as using a least squares polynomial regression of the point intrinsic parameter values against focus motor position. Optionally, joint refinement of the initial polynomial fits can be performed through focus-based bundle adjustment to refine the model.

Embodiments described herein provide the ability to retrieve accurate camera intrinsic parameters at an arbitrary focus motor position in the workspace such that accurate pose estimation of a fiducial marker can be performed even with an autofocusing camera. While embodiments described herein reference an autofocusing camera, one of ordinary skill in the art will appreciate that embodiments are applicable to manually focused cameras with and without focusing motors as the intrinsic parameters can be collected from a camera at different focal positions whether adjusted by motor or manually and whether adjusted by manual input commands or through conventional autofocusing techniques. Embodiments determine the practical impact of intrinsic parameters of a camera on the pose estimate in the given workspace to inform which parameters should be dynamically modeled. Embodiments generate a polynomial fit for the intrinsic parameters, which may first be performed through individual least squares regression and subsequently with an optional joint refinement to account for the interdependence of parameters on one another.

Embodiments of the present disclosure construct an accurate model for how the intrinsic parameters of a camera, which govern the projection of three-dimensional (3D) points onto the camera image plane, vary with respect to focus distance. In particular, embodiments consider the application of the generated model to pose estimation of a fiducial marker with an autofocusing camera. The problem of estimating fiducial marker pose arises in metrology applications aimed at accurate tracking of moving objects throughout a workspace without any specialized equipment. One can simply attach the fiducial marker to an object of interest and track the position of the fiducial marker. The pose estimation process relies on the intrinsic parameters of a camera to reconstruct the 3D marker pose from the two-dimensional (2D) projection of the marker in the image. Particularly in the case of a camera using a long focal length, autofocusing is employed as the object (and fiducial marker) can become unfocused when moving throughout the workspace. However, autofocusing changes the focus distance of the camera and therefore the intrinsic parameters of the camera. Conventionally, the accuracy loss from failure to compensate for changing intrinsic parameters may be tolerated, thereby accepting that position accuracy may not be ideal. Further, the workspace range may be restricted in order to limit the loss of fidelity without compensating for intrinsic parameters of a camera. Embodiments described herein improve on conventional methods through modeling of the intrinsic parameters of a camera as a function of the focus position (e.g., focus motor position) to enable accurate pose estimation of the fiducial throughout the desired workspace.

Embodiments described herein improve pose estimation accuracy through use of a dynamic model of the intrinsic parameters of a camera relative to using fixed intrinsic parameters throughout a workspace. The dynamic model of intrinsic parameters extends the viable workspace using a wider-ranging camera focus distance without concerns of pose estimation accuracy degradation when the focal distance changes. Further, embodiments described herein are employed without requiring specialized equipment, relying on a standard calibration grid as detailed below.

FIG. 1 illustrates a method of dynamically modeling the intrinsic parameters of a camera to improve pose estimation of a fiducial marker, embodiments of which are described in greater detail below. According to the flowchart, calibration data is collected at 1 from a series of discrete focus motor positions of a camera. From the calibration data, a set of constant point intrinsic parameters are generated at 2. From the set of constant point intrinsic parameters, a subset of intrinsic parameters are determined that are to be modeled dynamically at 3. For each intrinsic parameter of the subset of intrinsic parameters to be modeled dynamically, a fit of the point intrinsic parameter values against focus motor positions are performed at 4. At 5, a model is generated of the intrinsic parameters for the camera based, at least in part, on the fit of the point intrinsic parameter values against the focus motor positions. A position of a fiducial marker is determined at 6 within a field of view of the camera based, at least in part, on the model of the intrinsic parameters for the camera.

Many industrial applications require highly accurate knowledge of the six-degree of freedom (DOF) pose (position and orientation) of moving objects throughout a workspace. This is particularly true in applications using autonomous devices such as robots and where movement of these devices is determined and controlled through automated means. Obtaining highly accurate knowledge of the six-degree of freedom pose is achieved using embodiments described herein without any highly specialized equipment by placing a fiducial marker, which includes some known pattern, on the moving object to be tracked and using computer vision algorithms to localize key points on the fiducial marker.

For example, a number of manufacturing operations are dependent upon the accurate identification and locating of one or more objects. As shown in FIG. 2, by way of example, but not of limitation, the accurate determination of the position and orientation of a paint head 10 carried by a robotic arm 12 relative to workpiece 14 is useful during painting operations such that the workpiece or at least specific portions of the workpiece are appropriately painted while other portions of the workpiece remain unpainted and previously painted portions of the workpiece are not unnecessarily repainted. By accurately identifying the position and orientation of the paint head 10 relative to the workpiece 14, the proper portion of the workpiece is painted in an efficient manner, thereby conserving resources during the manufacturing process. In this regard, as a result of the accurate determination of the position and orientation of the paint head 10 relative to the workpiece 14, paint is conserved by uniformly applying a coat of paint of a desired thickness, while not unnecessarily re-painting previously painted surfaces, thereby also avoiding undesirable increases in the weight of the aircraft. Further, by accurately determining the position and orientation of the paint head 10 relative to the workpiece 14 and correspondingly ensuring that all portions of the workpiece that are intended to be painted have, in fact, been painted, the resulting appearance of the workpiece is improved along with the weather protection of the aircraft offered by the paint.

Although described above in conjunction with the accurate determination of the position of a paint head 10 relative to a workpiece 14, the method and apparatus of an example embodiment is also utilized to accurately determine the position and orientation of any of a variety of objects in conjunction with other manufacturing operations including drilling operations, cutting operations, etc. Further, the method and apparatus of an example embodiment is utilized in conjunction with the accurate determination of the position and orientation of an end effector, a robotic arm, or an object, such as the six-DOF pose information, in applications other than manufacturing.

The apparatus 20 of an example embodiment is depicted in FIG. 3. The apparatus 20 includes one or more cameras such as autofocusing camera 22. Although different types of sensors may be utilized in order to acquire images, the sensors of an example embodiment are cameras configured to acquire images of the respective fields of view. In one embodiment, the autofocusing camera 22 is positioned at a fixed position, such as a position having fixed x, y and z coordinates, although in other example embodiments the autofocusing camera 22 is configured to be controllably repositioned, such as by mounting the autofocusing camera 22 upon a rail that facilitates translation of the autofocusing camera 22 along a predefined path defined by the rail. As described below, however, the autofocusing camera 22 is configured to rotate about a pan axis and a tilt axis. The autofocusing camera 22 generally does not acquire an image that includes the entire workspace, but instead only that portion of the workspace in which the fiducial marker is located.

As shown in FIG. 3, the apparatus 20 of an example embodiment also includes a pan-tilt unit 26. The pan-tilt unit 26 is configured to support the autofocusing camera 22 and to controllably and separately alter a pan angle and a tilt angle at which the autofocusing camera 22 is positioned relative to the workspace and, more particularly, relative to the fiducial marker located within the space. As such, the autofocusing camera 22 is configured to acquire images of a portion of the workspace, such as the portion of the space within which the fiducial marker is disposed, at different combinations of pan and tilt angles. As the fiducial marker is positioned at any of various positions throughout the workspace, the pan-tilt unit 26 is configured to controllably reposition the autofocusing camera 22 in terms of the pan and tilt angles such that the autofocusing camera 22 is capable of viewing the entire workspace even though the autofocusing camera 22 is only capable of viewing a portion of the entire workspace at any particular combination of pan and tilt angles.

Although the pan-tilt unit 26 is configured in different manners, the pan-tilt unit of an example embodiment is depicted in FIG. 4 to include a platform 30 and an associated tilt servo motor 32 that is configured to controllably alter the tilt angle of the platform and, in turn, the tilt angle of the autofocusing camera 22. Additionally, the pan-tilt unit 26 of this example embodiment includes a pan servo motor 34 configured to controllably alter the pan angle of the platform 30 and, in some embodiments, both the platform and the tilt servo motor 32. By altering the pan angle of the platform 30, the pan servo motor 34 also controllably alters the pan angle of the autofocusing camera 22.

The apparatus 20 of FIG. 3 also includes a control system 28. The control system 28 is embodied in a variety of different manners including by a controller, a processor and any of a variety of computing devices, such as a personal computer, a computer workstation, a server, or the like. In an example embodiment, the control system 28 is configured to utilize the dynamic model of intrinsic parameters of the autofocusing camera 22, such as defined by model generated by embodiments described herein, to determine an estimate of the position and orientation of a fiducial marker in the coordinate system for the workspace from which an image is captured by the autofocusing camera 22. This determination of the estimate of the position and orientation of a fiduciary marker is based on the images acquired from the autofocusing camera 22 and also based on the pan and tilt angles at which the autofocusing camera 22 is positioned relative to the fiducial marker upon acquiring the image. Thus, the control system 28 of this example embodiment is configured to determine the position and orientation of a fiducial marker in the world coordinate system in an efficient and reliable manner, such as in real time with a relatively small error, based on an image of a fiducial marker captured by the autofocusing camera 22 positioned at a particular combination of pan and tilt angles.

Embodiments described herein employ the apparatus 20 of FIG. 3, to dynamically model intrinsic parameters of a camera to improve the accuracy of pose estimation of a fiducial marker. In one example, the fiducial marker is located coincident with an object for which the position and orientation is to be determined. As shown in FIG. 2, for example, the fiducial marker 16 is placed on and carried by an object to be identified, such as by being carried by a paint head 10 in order to determine the position and orientation of the paint head relative to a workpiece 14.

Various types of fiducial markers are utilized including a ChArUco board. One example of a ChArUco board 54 is depicted in FIG. 5. A ChArUco board includes a ChArUco pattern which is a combination of a checkerboard 56 and a grid of ArUco markers 58. The checkerboard portions provide the structure required for the calibration and detection in order to determine position and orientation, while the ArUco markers identify specific sections of the ChArUco pattern. The ArUco markers therefore permit the ChArUco pattern to be utilized in instances in which only a partial or an occluded view of the ChArUco board is available since the ArUco markers permit the portion of the ChArUco board that is visible to be identified. While in this example a ChArUco board is utilized as a fiducial marker, other types of fiducial patterns are utilized in other example embodiments.

For example, according to an embodiment described herein, a ChArUco board is used where the key points, the corners of the ChArUco board squares, are extracted via a standard algorithm implemented in OpenCV. In this example, for accurate localization of these key points, the fiducial marker encompasses a large portion of the camera's field of view and the captured image should be in sharp focus. To achieve this, a relatively long focal length (zoom level) should be used. However, a long focal length results in a limited depth of field (the depth of the region in which the camera can capture sharp images of objects), such that autofocus is used to ensure that the fiducial marker remains sharply in focus even as it moves throughout the workspace.

In this example, given the appropriate intrinsic properties of a camera, the relative pose between the ChArUco board and the camera is estimated using standard Perspective-n-Point algorithms such as solvePnP of OpenCV. The solvePnP algorithm uses information about the image locations of the detected ChArUco corners and fiducial square size to extract corresponding 3D board corner locations and therefore board pose. Here, the mapping of a 3D point in the world (ChArUco board) coordinate frame to its 2D image plane location is decomposed into two parts: transforming the point from the board frame into the camera 3D coordinate frame; and projecting from this camera coordinate frame into the 2D image plane. This mapping is mathematically specified in FIG. 6, which shows mapping from the 3D world (board) frame to a 2D image plane. FIG. 6 illustrates this mathematical mapping without lens distortion, while FIG. 7 illustrates this mathematical mapping to include lens distortion.

With reference to FIG. 6, the first transformation from fiducial marker board to camera coordinate frame, specified by a rotation R and translation T, is the desired relative pose of the fiducial marker with respect to the camera. The second step is specified by camera matrix K, which contains the effective focal length f and principal point ($u_0$, $v_0$) of the camera. The mathematical mapping including lens distortion of FIG. 7 employs radial distortion coefficients ($k_1$, $k_2$, $k_3$) and tangential distortion coefficients ($p_1$, $p_2$). In this light, solve PnP takes as input the parameters of this second step, the intrinsic parameters, and outputs the extrinsic parameters, the relative pose R, T of the fiducial marker board with respect to the camera.

In an example embodiment without autofocus and with fixed focal length, the camera intrinsic parameters are static and are determined with standard algorithms such as Zhang's method. However, embodiments described herein solve this problem for cameras with dynamic focal distances, such as with autofocus, where the camera focal distance changes and therefore the intrinsic parameters change. Embodiments provide a method of determining the appropriate camera intrinsic parameters at varying focal positions within the workspace to increase pose estimation accuracy of the fiducial marker. Embodiments provide an improvement of over 50% in pose estimation accuracy relative to a system using a single set of static intrinsic parameters for an autofocusing camera.

Embodiments described herein employ a camera, some embodiments of which include an autofocusing camera, that has a relatively narrow field of view in that the field of view of the camera generally does not cover an entire workspace. The system objective described herein is to retrieve the appropriate intrinsic parameters for a camera given a current focus motor position of the camera for use in fiducial marker pose estimation. Specifically, this involves accurately modeling how the intrinsic parameter values (f, $u_0$, $v_0$, $k_1$, $k_2$, $k_3$, $p_1$, $p_2$) vary with respect to the focus motor position.

According to an example embodiment, a set of calibration images is collected at each of a set of representative focus motor positions that cover the workspace range. Each set of images is then used to perform a standard intrinsic parameter calibration process to determine an appropriate set of "point" intrinsic parameters for that focus motor position. Sensitivity analysis is performed by perturbing the intrinsic parameters over the range seen in the point intrinsic parameter set to determine the impact of varying the different intrinsic parameters. In particular, this operation helps determine which intrinsic parameters should be fit dynamically, and which can be accurately modeled as static values. In an example, informed by this analysis, an independent least squares polynomial fit is performed for each parameter, regressing the point intrinsic parameter values against the focus motor position. The collection of these polynomial models specifies the fit dynamic intrinsic parameter model, and given an arbitrary focus motor position, the polynomial fits can be used to predict the appropriate intrinsic parameter values. An optional refinement of these polynomial fits is be performed using focus-based bundle adjustment to account for the interdependence of the intrinsic parameters. FIG. 8 illustrates the overall system employing this method.

As shown in FIG. 8, the process includes data collection 105, sensitivity analysis 130, and modeling. According to the illustrated embodiment, the process further includes model refinement 160. Data collection 105 of the illustrated embodiment begins with the movement of a camera to a new position relative to the calibration grid (e.g., ChArUco grid) at 110. A dataset of images is captured at 115 of the calibration grid at varying orientations and focal distances. Calibration for this focus position is performed at 120, such as using Zhang's method. It is determined at 125 if the workspace range is covered or if there are portions of the workspace requiring additional data capture. If the workspace has not yet been covered, the process returns to the data collection process of moving the camera to a new, desired position for data capture at 110. If the workspace has been covered, the output from the data collection 105 is generated as calibration images, point intrinsics, and corresponding focus positions at 127. The process of FIG. 8 then proceeds to a sensitivity analysis 130 using the output of calibration images, point intrinsic parameters, and the focus positions shown at 127. Intrinsic parameter values for the camera are perturbed at 135 to determine which intrinsic parameters can be modeled as static values and to identify which parameters require dynamic modeling due to their impact on the pose estimation when varied. The output from the sensitivity analysis at 140 are the intrinsic parameters for the camera that should be dynamically modeled. Parameters that had minimal impact on pose estimation when varied do not require dynamic modeling as they can be fixed values while achieving similar results. Model fitting is performed at 145, where for each intrinsic parameter that is to be dynamically modeled, an appropriate polynomial degree is determined, and a polynomial fit is performed of point intrinsic values against focus position at 150. The output of the model fitting is a model of intrinsic parameter values corresponding to the various focus positions of the camera to improve pose estimation of the camera shown at 170. While some embodiments stop with this model, optionally, model refinement may occur as shown at 160. This model refinement includes focus-based bundle adjustment with polynomial models as the initial guess as shown at 165. This refinement optionally establishes the interrelations between intrinsic parameters to render the model more efficient and effective at improving pose estimation of the fiducial marker within the workspace. The model refinement 160 output is a model of intrinsic parameter values corresponding to various focus positions of the camera as shown at 170 with interrelated parameters identified.

With respect to the data collection element 105 of FIG. 8, a planar calibration grid, such as a ChArUco board, is used to estimate each point intrinsic parameter value. The distance between the camera and the calibration grid is varied roughly uniformly throughout the workspace range, in increments that give sufficient coverage of the workspace at 110. After positioning the camera at a given distance from the calibration grid, autofocus is performed and the resulting focus motor position is associated with the point intrinsic parameter values obtained from that position. Several images of the calibration grid are captured at the given position, as the orientation of the calibration grid is varied in a predetermined manner at 115. A standard calibration approach, such as Zhang's method, is performed using these images to compute the point intrinsic parameter values (f, $u_0$, $v_0$, $k_1$, $k_2$, $k_3$, $p_1$, $p_2$) for the given focus motor position at 120. The process is repeated at each distance such that the overall output of this operation is a set of point intrinsic values and their corresponding focus motor positions at 127.

Given the collected point intrinsic values from above, sensitivity analysis of 130 of FIG. 8 considers perturbing the intrinsic parameters, over the range attained in the point intrinsic parameter values, to gauge the impact on the pose estimate from using incorrect intrinsic parameter values at 135. In this example, if this impact is relatively small, then using a constant/static fit for the given parameter is a reasonable model that could simplify the process and combat overfitting. If the perturbation impact is large, then the corresponding intrinsic parameter is not considered static, and a non-constant polynomial is used for fitting the parameter. In this way, sensitivity analysis helps determine which parameters are modeled dynamically in model fitting at 145.

The method of example embodiments includes selecting a given image from the data collection operation above, and using the corresponding point intrinsic values as the "default". The following process is then executed for each intrinsic parameter of interest (e.g., f, $u_0$, $v_0$, $k_1$, $k_2$, $k_3$, $p_1$, $p_2$). The given parameter is varied, set to each of the values obtained across the entire set of point intrinsic parameters, while leaving the other parameters fixed at their default values. This produces a set of modified intrinsic parameters which are then each used to estimate the pose of the calibration grid with respect to the camera in the selected image. In this example, the resulting components of the pose are then plotted as a function of the varying parameter to better understand the impact of that parameter on the pose estimate. In particular, in this example the range (maximum-minimum value) of the resulting component is used to quantify the impact on the pose estimate of using a constant fit for that parameter. While the aforementioned process only considered a single image and focus motor position, the process is optionally repeated for several images at different focus motor positions to give a better overall sense of each parameter's pose estimate impact. An example of this process is described further below.

Sensitivity analysis is a generally useful operation since the impact of the intrinsic parameters can be camera and workspace dependent. In one example, the camera used in this implementation has distortion coefficients which minimally impact the pose despite varying significantly across the point intrinsic parameters set. In another example, for a camera with more significant distortion, this might not be the case. Similarly, the amount of movement of the principle point ($u_0$, $v_0$,) with respect to the focus motor position can differ between cameras.

After obtaining the point intrinsic parameters and using sensitivity analysis to inform which parameters should be dynamically fit, the model fitting is executed as shown at 145 of FIG. 8 using least squares polynomial fitting for each parameter independently. The degree of individual polynomials may vary based on the individual camera, but is determined through various standard methods like cross validation. If the reported focus motor position (after focusing) varies roughly linearly with the focus distance, a linear model for the effective focal length f and the relevant distortion coefficients is expected to work well. FIG. 9 illustrates polynomial fits along with the obtained point intrinsic parameter values against the focus motor position. The end result of this polynomial fitting process is a collection of polynomial fits, one for each dynamically estimated intrinsic parameter against focus motor position. In this example, the model is then used to estimate pose of the fiducial marker relative to the camera more accurately. Given a new focus motor position of the camera, each polynomial fit outputs a parameter value and together these values include the intrinsic parameters (camera matrix and distortion coefficients) needed for pose estimation algorithms such as solve PnP.

In this example, after performing the initial model fitting, the model, output at 170 of FIG. 8, is directly applied. Particularly in the case where parameters are largely decoupled such an embodiment will work well. Embodiments optionally employ a further refinement operation shown at 160 of FIG. 8, described herein as focus-based bundle adjustment, to account for the potential coupling between intrinsic parameters that was not considered when the individual polynomial fitting was performed. This process involves re-using a batch of images from the data collection operation, each with a known corresponding focus motor position. In this example, a subset of the initial data collection data is used. Given these images as input, specifically the extracted key point (e.g., ChArUco corner) information, and the corresponding focus motor positions, bundle adjustment are used to parametrically refine the polynomial fits. In this example, specifically, Levenberg-Marquardt optimization is performed to minimize the re-projection error across the batch of images by jointly optimizing the polynomial fit parameters for each of the different intrinsic parameters. In contrast to the operation described above which independently performed a least square polynomial fit for each intrinsic parameter, this refinement operation simultaneously refines the polynomial models (using the focus motor position for each image as input) to reduce the overall re-projection error across the batch of images. In this example, this bundle adjustment approach requires an initial guess for the polynomial parameter values, and for this the results of the individual least squares polynomial fits is used. The output of this operation is a refined set of polynomial fits against focus motor position for each parameter.

EXAMPLE IMPLEMENTATION

According to an example implementation of the above-described approach, a narrow field of view camera was provided with a native resolution of 7920×6004 pixels, sensor size of 36.4 mm×27.6 mm (Horizontal×Vertical), set to a focal length of 200 mm. A ChArUco board calibration grid positioned within the field of view. The ChArUco calibration board was displayed on a 4K flat panel LCT TV monitor produced square sizes of 2.35 cm and 40×20 squares (Horizontal×Vertical). The distances between camera and calibration grid ranged from roughly 10-16 feet. Data collection was conducted of roughly 25 images at each of 12 different positions. Autofocusing was performed before the first image collected at each position (in which the board was positioned facing the camera) and the board orientation was varied across the images collected at each position. Zhang's method as implemented in OpenCV was used to obtain the point intrinsic values, with the results of the data collection summarized in the table of FIG. 10. The reported re-projection error is obtained using either the mean or RMS (root mean square) error within each image and the result is averaged across the calibration images for the given position.

Figure 11A:
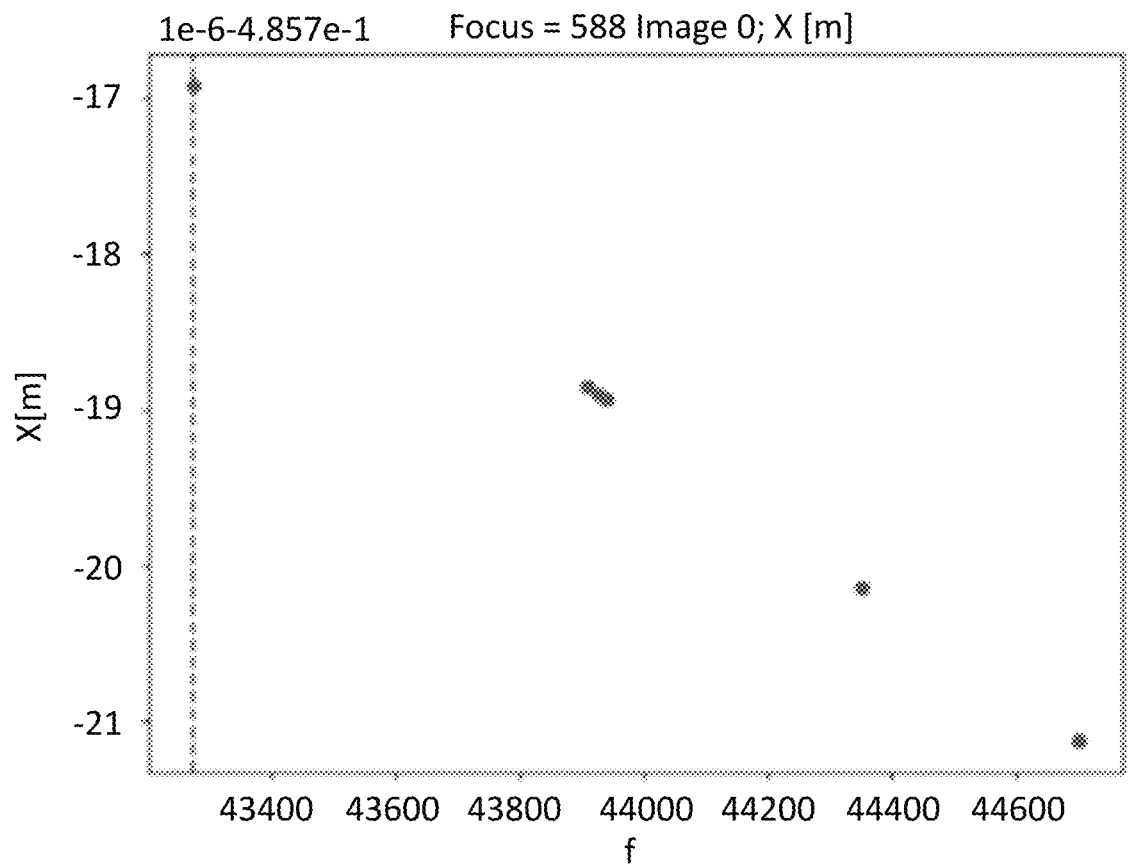
Figure 11B:
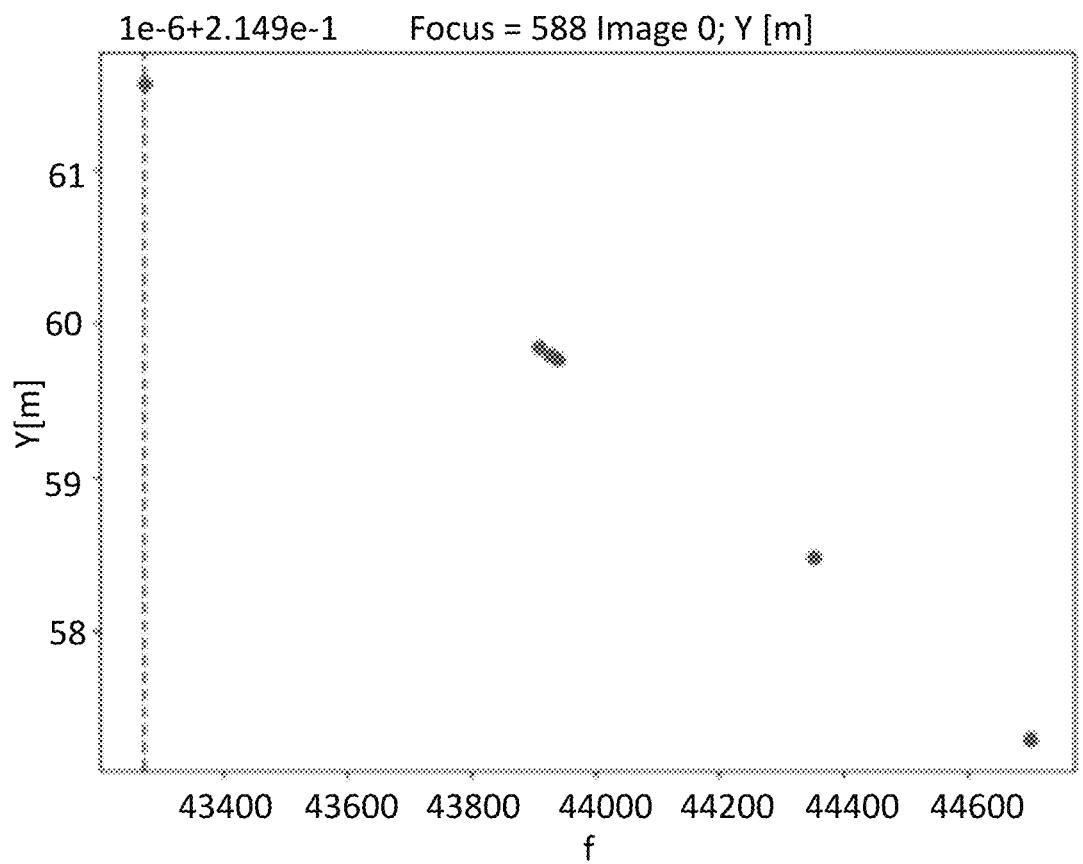
Figure 11C:
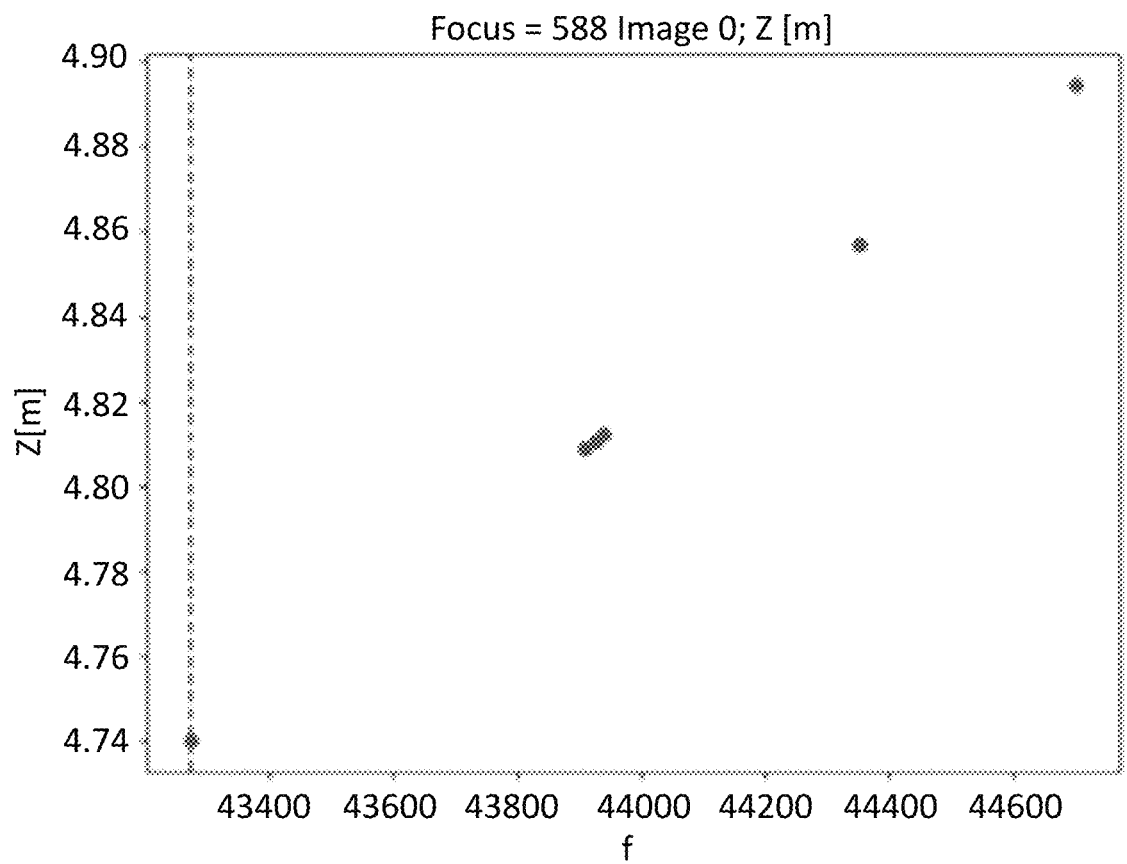
Figure 11D:
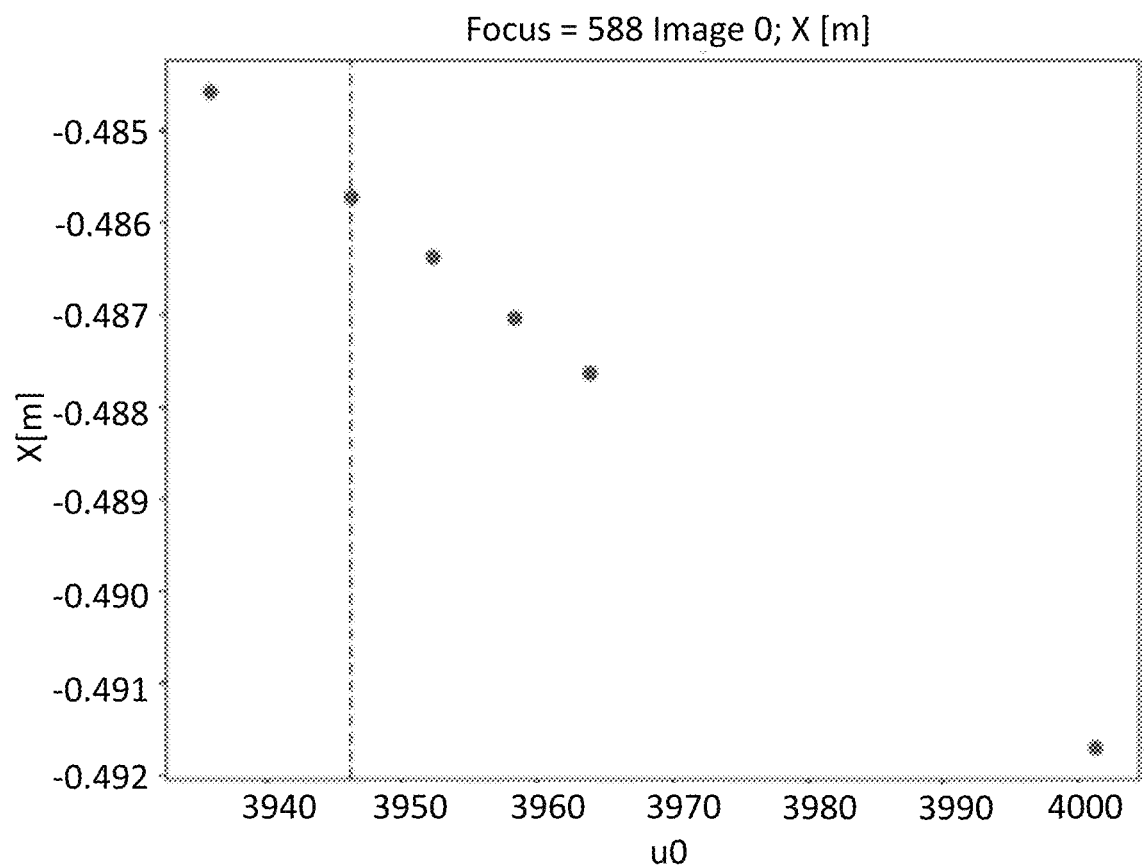
Figure 11E:
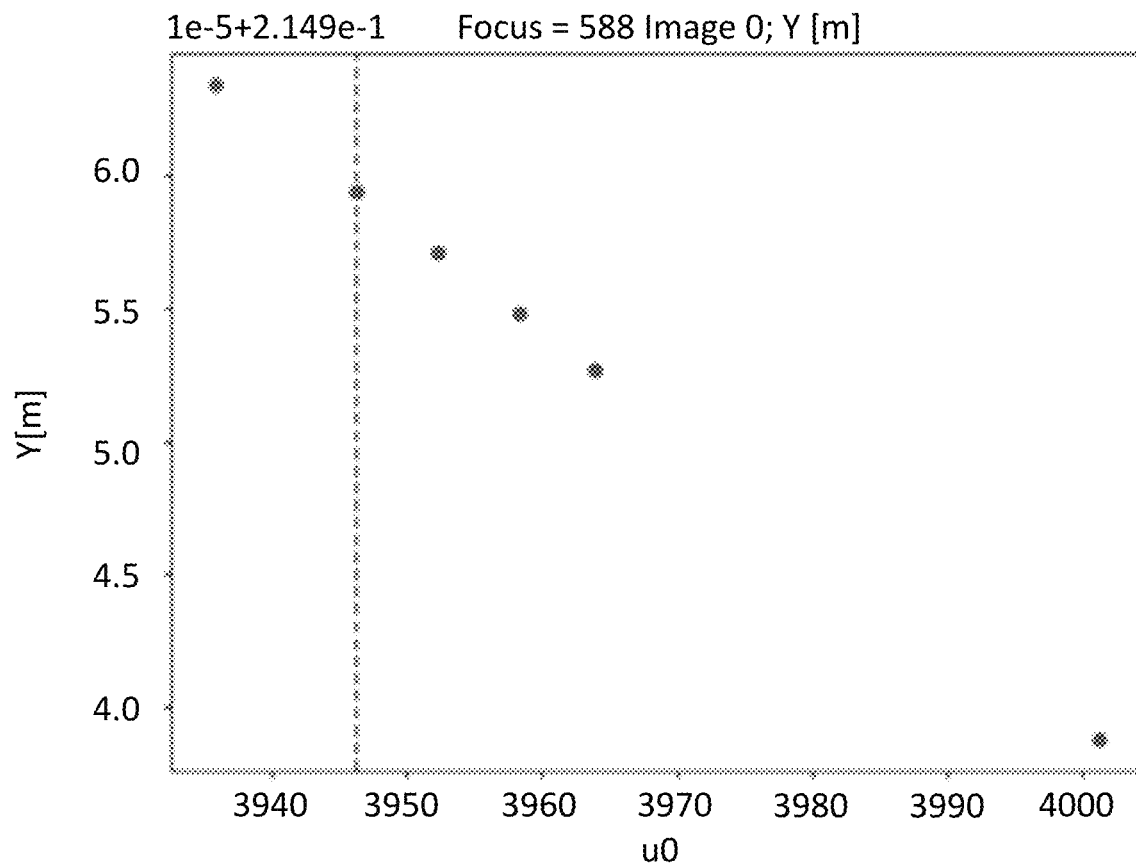
Figure 11F:
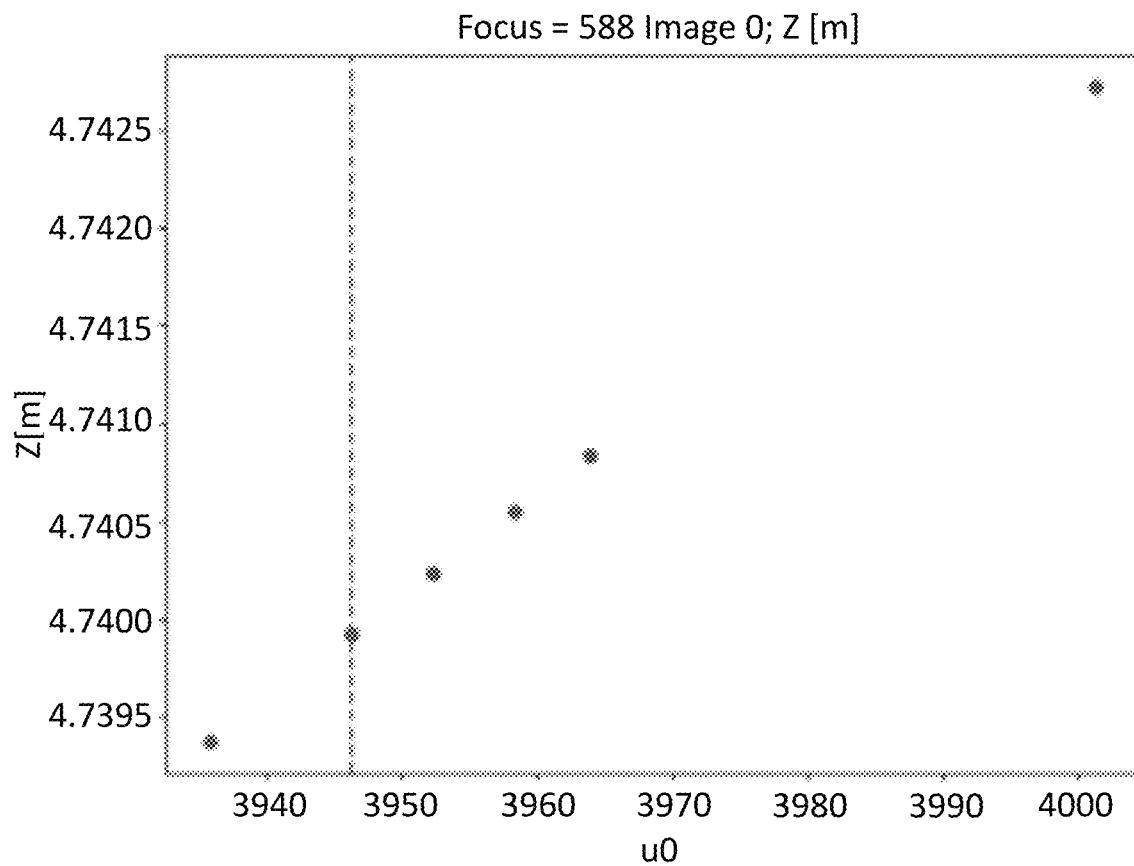
Figure 12A:
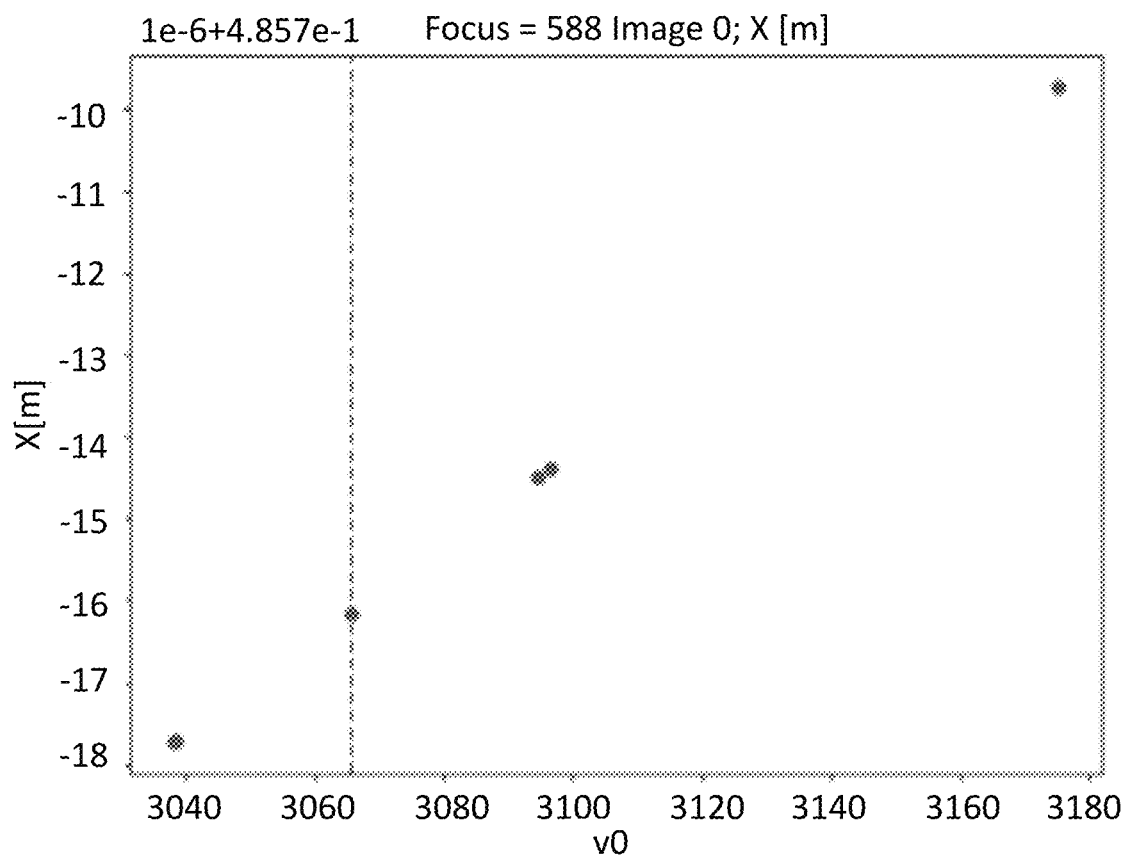
Figure 12B:
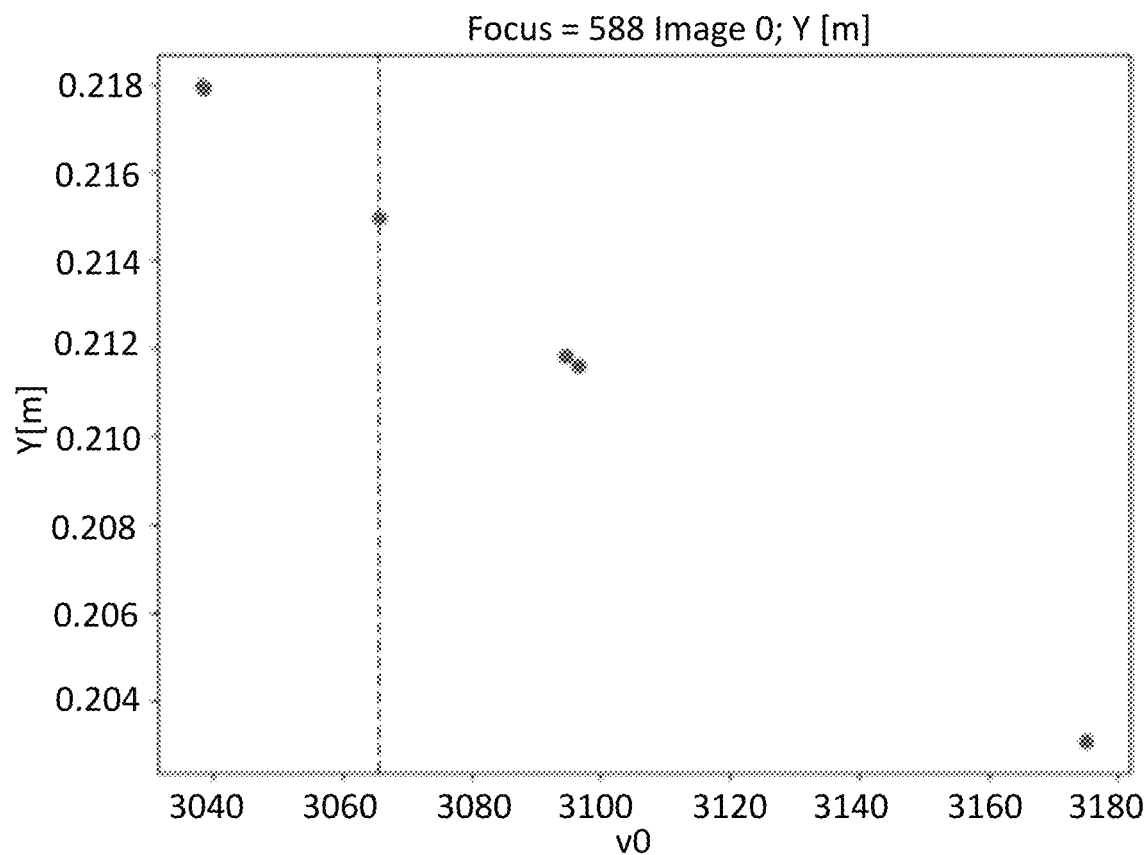
Figure 12C:
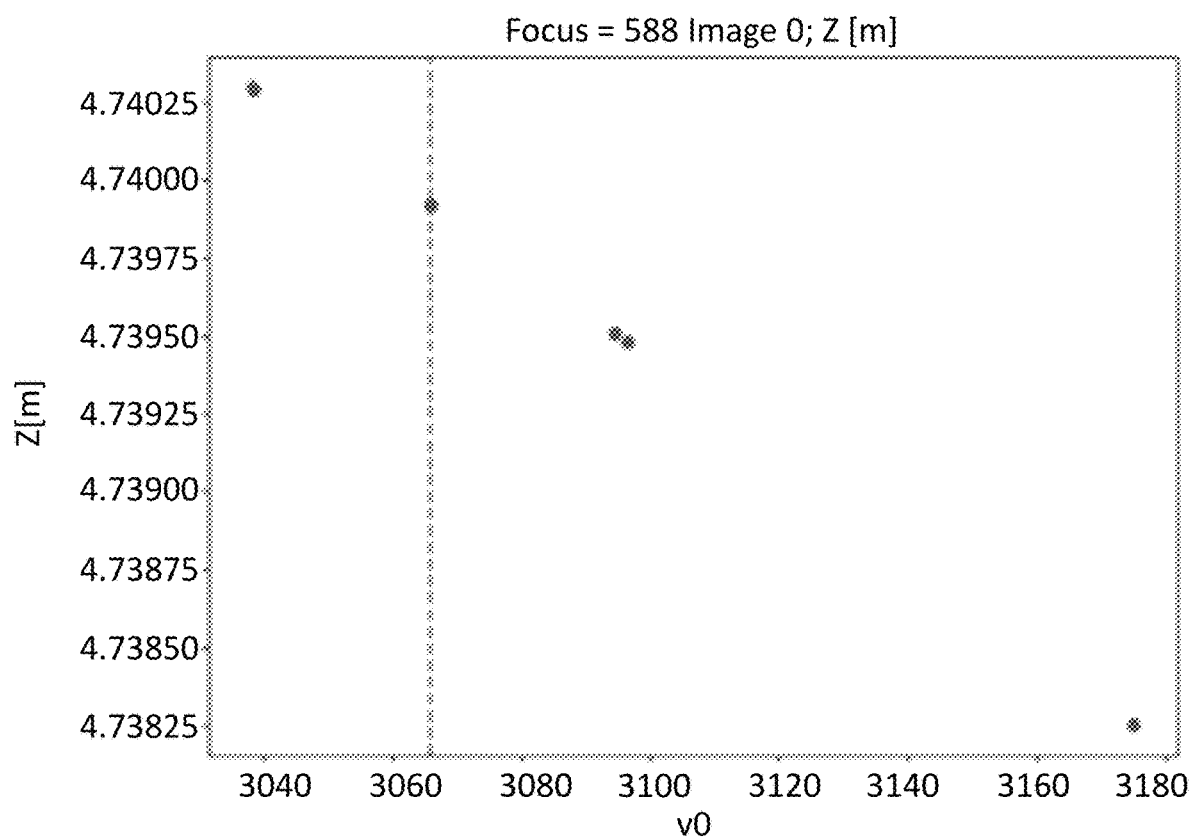
Figure 12D:
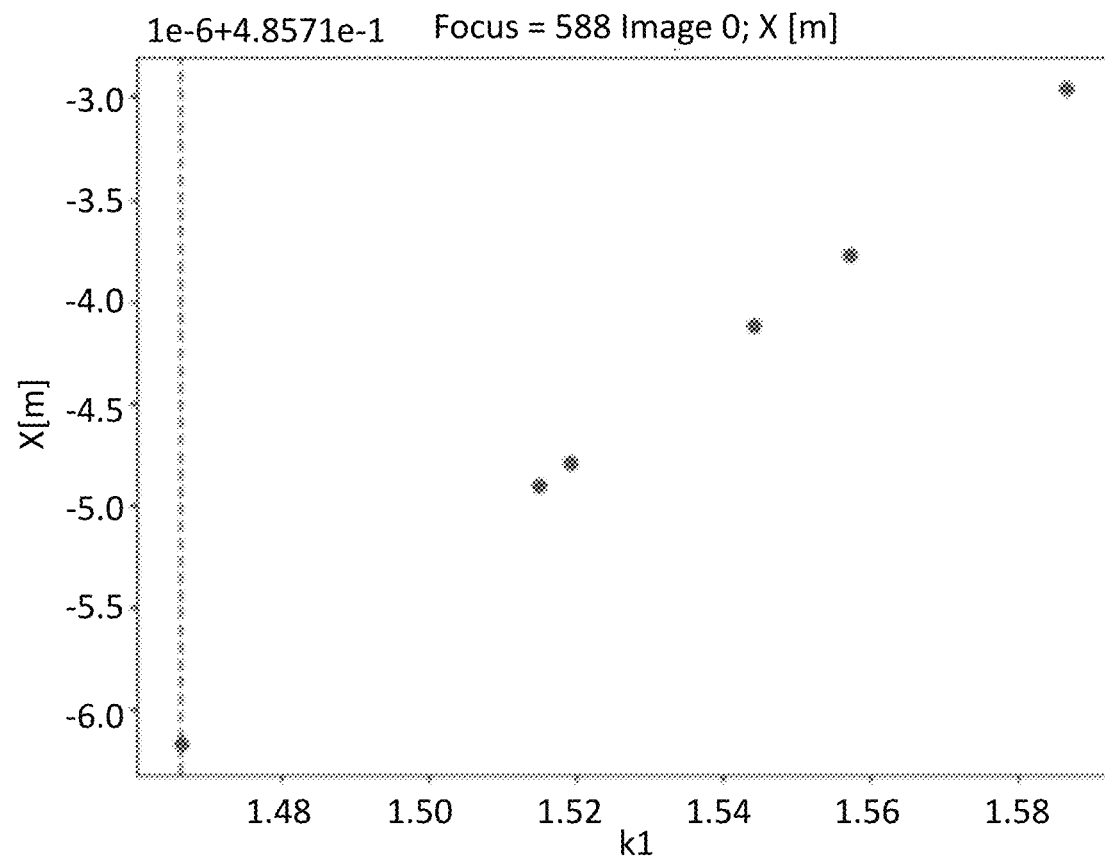
Figure 12E:
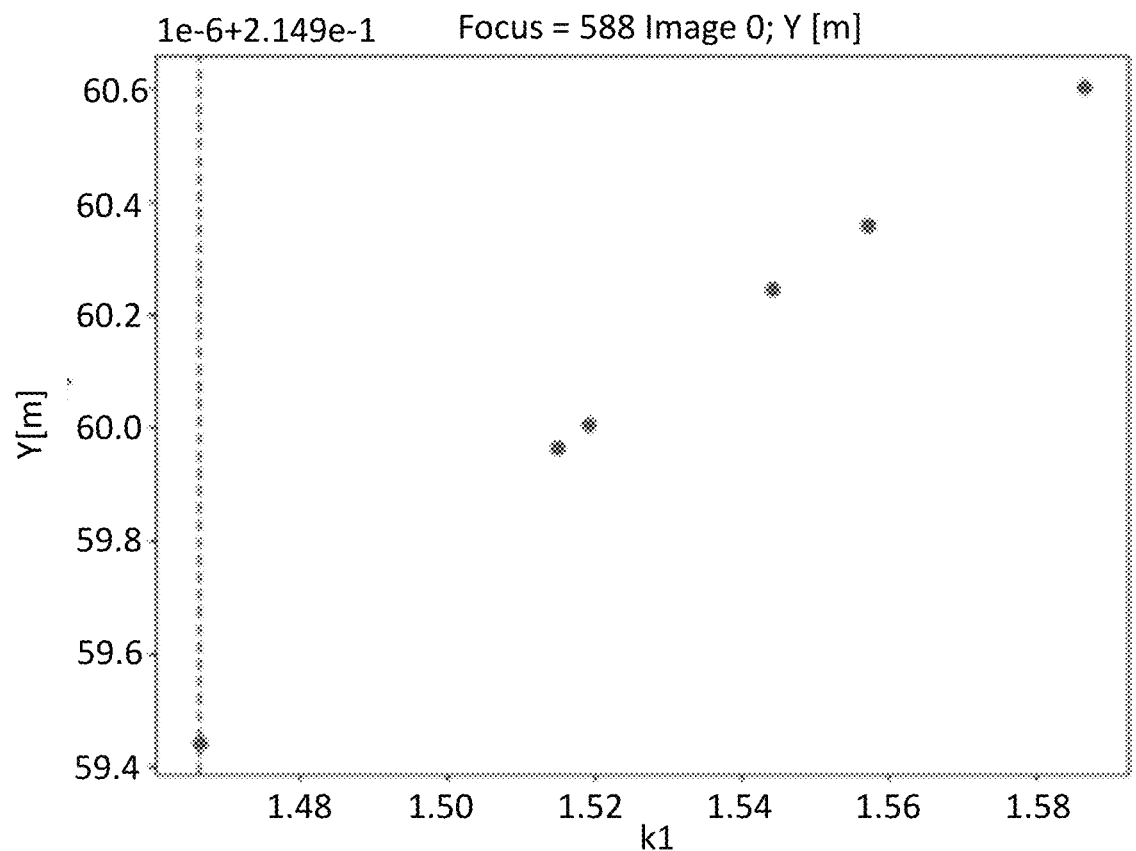
Figure 12F:
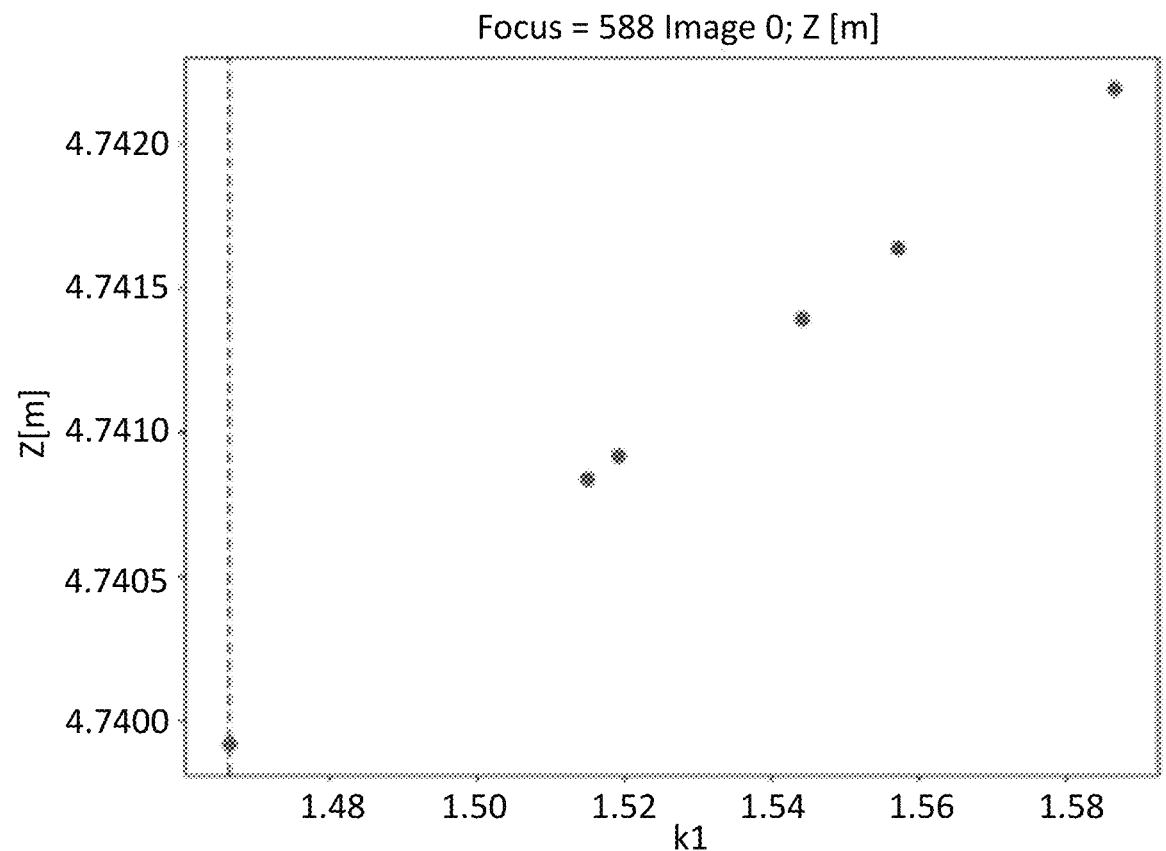

Embodiments described herein employ sensitivity analysis to better understand the impact of individual intrinsic parameters on the pose estimate. FIGS. 11A-F illustrate the results of sensitivity analysis on a dataset of six focus motor positions from the example implementation. As shown in FIGS. 11A-F, 12A-F, and 13A-C, the plots of estimated positions (X, Y, Z components separately) were collected when each parameter was individually perturbed, and the other parameters were fixed at their default value. Each set of plots for X, Y, and Z components considers perturbing a different parameter (f, $u_0$, $v_0$, $k_1$, $k_2$) while each column considers a different position component (X, Y, Z). For example, FIG. 11A illustrates the X-component value of perturbing parameter f. FIG. 11B illustrates the Y-component value of perturbing parameter f, while FIG. 11C illustrates the Z-component value of perturbing parameter f. FIGS. 11D, 11E, and 11F illustrate the X-component, Y-component, and Z-component values, respectively, of perturbing parameter $u_0$. FIGS. 12A, 12B, and 12C illustrate the X-component, Y-component, and Z-component values, respectively, of perturbing parameter $v_0$. FIGS. 12D, 12E, and 12F illustrate the X-component, Y-component, and Z-component values, respectively, of perturbing parameter $k_1$. FIGS. 13A, 13B, and 13C illustrate the X-component, Y-component, and Z-component values, respectively, of perturbing parameter $k_2$.

The plots depicted in FIGS. 11A-F, 12A-F, and 13A-C are generated using one image (Image 0) at focus motor position 588. The vertical dashed lines of the plot indicate the nominal/default value of that parameter using the appropriate point intrinsic parameter value for the given focus motor position. The key insights from the plots are summarized in the table of FIG. 14. Notably, perturbing the effective focal length parameter f had the strongest impact with a range of 150 mm on the estimated Z-component (FIG. 11C) of the calibration grid pose but negligible impact on the X- or Y-components (FIGS. 11A and 11B). Similarly, $u_0$ primarily impacted the X-component (FIG. 11D) with a range of 7.5 mm and $v_0$ primarily impacted the Y-component (FIG. 12B) with a range of 15 mm. Conversely, $k_1$ had only a slight impact on the Z-component (FIG. 12F) and $k_2$ had an overall negligible impact on pose. This process demonstrates that dynamically fitting all but $k_2$ improves pose estimation accuracy with the given camera in the given workspace.

Based on the sensitivity analysis, two distinct polynomial models were considered for the intrinsic parameters: Linear Constant (LC): Linear fit for f, $k_1$, $k_2$, $k_3$, constant fit for $u_0$, $v_0$; and Linear Linear (LL): Linear fit for f, $k_1$, $k_2$, $k_3$, linear fit for $u_0$, $v_0$. The parameters $p_1$, $p_2$ were observed to have negligible impact such that constant fits would be used in both cases. Similarly, $k_2$ and $k_3$ could be fit with constants without significant impact. Both constant and linear fits were considered for $u_0$, $v_0$ as there is an apparent noisy linear trend as depicted in FIG. 15 which illustrates intrinsic results for $u_0$, $v_0$ across the twelve different motor positions considered.

The experimental objective of the aforementioned example implementation is to compare the quality of the pose estimates using the fitted dynamic intrinsic parameter system over a standard system employing one set of static intrinsic values for the entire workspace regardless of focal distance. To explore this comparison, a leave-one-out validation approach is provided. The polynomial models were fit to all but one of the focus motor positions and were then used to predict the poses of the roughly 25 images taken at the excluded focus motor position. These pose estimates were compared against the pose estimates obtained by the point intrinsic parameter values at that position, which were treated as ground-truth. The average pose difference for each component of the pose across these 25 images was computed. The process was repeated, leaving out a different focus motor position on each iteration. The overall average pose difference across the different motor positions was computed and used as an error metric. In addition to testing the LC and LL models via this scheme, the performance was considered when using static intrinsic parameter values. Specifically, the "median" intrinsic parameter values, the point intrinsic parameter values collected at the median focus motor position, were used to predict the pose for the images at the left-out position, with the median position not considered as a left-out position in any case. These "median" intrinsic parameter values reflect the basic alternative of using one set of intrinsic values across the entire workspace regardless of focus motor position.

The results of this comparison are summarized in the table of FIG. 16. Both the dynamic intrinsic models (LC and LL) greatly outperform the median intrinsic values approach. The LC model performs better than the LL model in terms of matching angle, and slightly worse in terms of matching position. The LC model attains an improvement of 23.53% in angle and 87.45% in position over the median intrinsic parameter values, yielding an average improvement of over 50%. The performance of these models against focus motor position is visualized in FIG. 17 which shows that while all models perform somewhat comparably in angle, the dynamic intrinsic parameter models perform significantly better than the median intrinsic parameter value approach in matching the point intrinsic parameter value estimated position. The median intrinsic parameter estimate rapidly diverges from the point of intrinsic parameter estimate as the focus motor position shifts away from the median focus position of 473. Overall, these results confirm that the dynamic intrinsic parameter model approach, even without refinement, significantly outperforms the standard alternative of using one set of static intrinsic parameter values for pose estimation regardless of focal distance.

Embodiments described herein include model refinement using the Linear Constant model, now fit to the focus motor position as an initial guess. The focus-based bundle adjustment of the example implementation was performed using two randomly selected images from each focus motor position. Two different, randomly selected images from each focus motor position were also used to form a test set. The re-projection error when using the refined (bundle adjusted) intrinsic parameters, initial polynomial fit, and point intrinsic parameters were compared. As illustrated in FIG. 18, the initial and refined fits obtain similar re-projection errors although the refined intrinsic parameters are slightly but consistently lower. This suggests that the model refinement improves the pose estimation, but that the initial polynomial fit approach remains an improvement over existing alternatives.

Embodiments described herein employ a non-trivial extension of existing calibration approaches that assume a fixed focal distance. While a standard calibration approach may be employed to determine initial point intrinsic parameter values for a given set of focus motor positions, embodiments of the present disclosure use these initial points to perform a sensitivity analysis to identify what parameters should be modeled dynamically. Individual polynomial fitting is then performed for each of these parameters using these point intrinsic parameters, and in this example an optional bundle adjustment refinement is performed. This process improves pose estimation accuracy over using static point intrinsic parameter values by more than 50%.

Performing a sensitivity analysis to identify which intrinsic parameters should be static and which should be dynamically modeled ensures that the intrinsic parameter model is efficient and effective. Further, the disclosed modeling process does not require multiple procedures for individually fitting the different intrinsic parameters. Embodiments rely only on use of a standard calibration grid for use in fitting the dynamic intrinsic parameter model and avoids the use of expensive, specialized, and/or bulky equipment such as motion capture systems.

FIGS. 1 and 8 illustrate flowcharts depicting methods according to example embodiments of the present disclosure for modeling dynamic intrinsic parameters of a camera, and more specifically, for determining which intrinsic parameters of a camera affect pose estimation and modeling those intrinsic parameters to improve the accuracy of pose estimation of a fiducial marker, particularly when using an autofocusing camera. It will be understood that each block of the flowcharts and combination of blocks in the flowcharts may be implemented by various means, such as hardware, firmware, processor, circuitry, and/or other communication devices associated with execution of software including one or more computer program instructions. In one example, one or more of the procedures described above is embodied by computer program instructions. In this regard, the computer program instructions which embody the procedures described above are stored by a memory, such as a memory in control system 28 of apparatus 20 employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, are in some embodiments implemented by special purpose hardware-based computer systems which perform the specified functions, or combinations of special purpose hardware and computer instructions.

In an example embodiment, an apparatus for performing the method of FIGS. 1 and 8 above comprises a processor configured to perform some or each of the operations (1-6 and/or 105-170) described above. The processor is, for example, configured to perform the operations (1-6 and/or 105-170) by performing hardware implemented logical functions, executing stored instructions, or executing algorithms for performing each of the operations. Alternatively, the apparatus comprises means for performing each of the operations described above. In this regard, according to an example embodiment, examples of means for performing operations 1-6 and/or 105-170 comprises, for example, a processor of a control system 28 and/or a device or circuit for executing instructions or executing an algorithm for processing information as described above.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A method for modeling intrinsic parameters of a camera, the method comprising: collecting, using the camera having a focus motor, calibration data at a series of discrete focus motor positions; generating, from the calibration data, a set of constant point intrinsic parameters; determining, from the set of constant point intrinsic parameters, a subset of intrinsic parameters to model dynamically, wherein determining the subset of intrinsic parameters to model dynamically comprises perturbing each constant point intrinsic parameter of the set of constant point intrinsic parameters over a value range of each respective constant point intrinsic parameter to determine the subset of intrinsic parameters that impact a position estimate of a fiducial marker; performing, for each intrinsic parameter of the subset of intrinsic parameters, a fit of point intrinsic parameter values against the focus motor positions; generating a model of intrinsic parameters for the camera based, at least in part, on the fit of the point intrinsic parameter values against the focus motor positions; and determining a position of the fiducial marker within a field of view of the camera based, at least in part, on the model of the intrinsic parameters for the camera.

2. The method of claim 1, wherein performing the fit of the point intrinsic parameter values against the focus motor positions comprises performing the fit using a least squares polynomial regression of the point intrinsic parameter values against the focus motor positions to generate the model of the intrinsic parameters for the camera.

3. The method of claim 1, wherein generating a model of the intrinsic parameters for the camera further comprises performing joint refinement on the fit of the point intrinsic parameter values against the focus motor positions for the subset of intrinsic parameters.

4. The method of claim 3, wherein performing the joint refinement on the fit of the point intrinsic parameter values against the focus motor positions for the subset of intrinsic parameters comprises performing focus-based bundle adjustment on the fit of the point intrinsic parameter values against the focus motor positions for the subset of intrinsic parameters.

5. The method of claim 4, wherein the focus-based bundle adjustment on the fit of the point intrinsic parameter values against the focus motor positions for the subset of intrinsic parameters is performed using a polynomial model as an initial guess.

6. The method of claim 1, wherein collecting, using the camera having the focus motor, the calibration data at the series of discrete focus motor positions comprises:
capturing a plurality of images using the camera at different orientations using different focal distances.

7. The method of claim 6, wherein capturing the plurality of images using the camera at different orientations using different focal distances comprises capturing the plurality of images of a ChArUco board using the camera at different orientations using different focal distances.

8. The method of claim 1, wherein determining the position of the fiducial marker within the field of view of the camera comprises determining the position of the fiducial marker within the field of view of the camera using a translation between a camera coordinate frame of the camera and a fiducial marker coordinate frame of the fiducial marker.

9. The method of claim 8, wherein determining the position of the fiducial marker within the field of view of the camera further comprises projecting the position of the fiducial marker in the camera coordinate frame in three-dimensions to a two-dimensional image plane.

10. The method of claim 1, wherein determining the position of the fiducial marker within the field of view of the camera comprises determining the position and orientation of the fiducial marker.

11. An apparatus for modeling intrinsic parameters of a camera, the apparatus comprising:
the camera configured to acquire a plurality of static images of different orientations of a space in which a fiducial marker is disposed;
a control system configured to:
determine calibration data from the plurality of static images;
generate, from the calibration data, a set of constant point intrinsic parameters;
determine, from the set of constant point intrinsic parameters, a subset of intrinsic parameters to model dynamically, wherein the subset of intrinsic parameters to dynamically model is determined by perturbing each constant point intrinsic parameter of the set of constant point intrinsic parameters over a value range of each respective constant point intrinsic parameter to determine the subset of intrinsic parameters that impact a position estimate of the fiducial marker;
perform, for each intrinsic parameter of the subset of intrinsic parameters, a fit of point of intrinsic parameter values against focus motor positions;
generate a model of intrinsic parameters for the camera based at least in part on the fit of the point intrinsic parameter values against the focus motor positions; and
determine a position of the fiducial marker within a field of view of the camera based, at least in part, on the model of the intrinsic parameters for the camera.

12. The apparatus of claim 11, wherein the control system configured to perform the fit of the point intrinsic parameter values against the focus motor positions is further configured to perform the fit using a least squares polynomial regression of the point intrinsic parameter values against the focus motor positions to generate the model of the intrinsic parameters for the camera.

13. The apparatus of claim 11, wherein the control system configured to generate a model of the intrinsic parameters for the camera is further configured to perform joint refinement on the fit of the point intrinsic parameter values against the focus motor positions for the subset of intrinsic parameters.

14. The apparatus of claim 13, wherein the control system configured to perform the joint refinement on the fit of the point intrinsic parameter values against the focus motor positions for the subset of intrinsic parameters is further configured to perform focus-based bundle adjustment on the fit of the point intrinsic parameter values against the focus motor positions for the subset of intrinsic parameters.

15. The apparatus of claim 14, wherein the focus-based bundle adjustment on the fit of the point intrinsic parameter values against the focus motor positions for the subset of intrinsic parameters is performed using a polynomial model as an initial guess.

16. The apparatus of claim 11, wherein the fiducial marker comprises a ChArUco board.

17. A control system for modeling intrinsic parameters of a camera, the control system configured to: collect, using the camera having a focus motor, calibration data at a series of discrete focus motor positions; generate, from the calibration data, a set of constant point intrinsic parameters; determine, from the set of constant point intrinsic parameters, a subset of intrinsic parameters to model dynamically, wherein the subset of intrinsic parameters to dynamically model is determined by perturbing each constant point intrinsic parameter of the set of constant point intrinsic parameters over a value range of each respective constant point intrinsic parameter to determine the subset of intrinsic parameters that impact a position estimate of a fiducial marker; perform, for each intrinsic parameter of the subset of intrinsic parameters, a fit of point intrinsic parameter values against the focus motor positions; generate a model of intrinsic parameters for the camera based, at least in part, on the fit of the point intrinsic parameter values against the focus motor positions; and determine a position of the fiducial marker within a field of view of the camera based, at least in part, on the model of the intrinsic parameters for the camera.

18. The control system of claim 17, wherein the control system configured to determine which intrinsic parameters alter the position estimate of the fiducial marker is further configured to perturb each constant point intrinsic parameter of the set of constant point intrinsic parameters to determine which intrinsic parameters alter the position estimate of the fiducial marker.

19. The control system of claim 17, wherein the control system configured to perform the fit of the point intrinsic parameter values against the focus motor positions is further configured to perform the fit using a least squares polynomial regression of the point intrinsic parameter values against the focus motor positions to generate the model of the intrinsic parameters for the camera.

20. The control system of claim 17, wherein the control system configured to generate a model of the intrinsic parameters for the camera is further configured to perform joint refinement on the fit of the point intrinsic parameter values against the focus motor positions for the subset of intrinsic parameters.

21. The control system of claim 20, wherein the control system configured to perform the joint refinement on the fit of the point intrinsic parameter values against the focus motor positions for the subset of intrinsic parameters is further configured to perform focus-based bundle adjustment on the fit of the point intrinsic parameter values against the focus motor positions for the subset of intrinsic parameters using a polynomial model as an initial guess.

* * * * *